US008024825B2

(12) United States Patent
Harrison et al.

(10) Patent No.: US 8,024,825 B2
(45) Date of Patent: Sep. 27, 2011

(54) COLLAPSIBLE CRIB

(76) Inventors: Richard Harrison, Hockessin, DE (US);
William F Mann, III, Avondale, PA (US)

( * ) Notice: Subject to any disclaimer, the term of this patent is extended or adjusted under 35 U.S.C. 154(b) by 380 days.

(21) Appl. No.: 12/321,750

(22) Filed: Jan. 26, 2009

(65) Prior Publication Data
US 2009/0134603 A1 May 28, 2009

Related U.S. Application Data

(63) Continuation-in-part of application No. 09/642,948, filed on Aug. 22, 2000, now Pat. No. 6,428,033, and a continuation-in-part of application No. 10/014,125, filed on Dec. 11, 2001, now Pat. No. 6,776,433, and a continuation-in-part of application No. 11/221,079, filed on Sep. 8, 2005, now Pat. No. 7,503,085.

(51) Int. Cl.
*A47D 7/00* (2006.01)
*A47D 13/06* (2006.01)

(52) U.S. Cl. .......................... 5/99.1; 280/647
(58) Field of Classification Search ............... 280/644, 280/647, 649, 650, 87.05; 297/16.1, 16.2, 297/3, 94, 7; 5/99.1, 93.1, 98.1, 98.2, 93.2, 5/95
See application file for complete search history.

(56) References Cited

U.S. PATENT DOCUMENTS

| | | | | |
|---|---|---|---|---|
| 2,927,331 A * | 3/1960 | Ruiz | ................................ | 5/97 |
| 4,045,051 A * | 8/1977 | Igarashi et al. | ................ | 280/644 |
| 4,052,087 A * | 10/1977 | Gagliardi | ..................... | 280/650 |
| 4,140,341 A * | 2/1979 | Rabe | ............................... | 297/45 |
| 4,202,065 A * | 5/1980 | Sullivan | ........................... | 5/99.1 |
| 4,258,951 A * | 3/1981 | Groom | .......................... | 297/16.2 |
| 4,304,017 A * | 12/1981 | Mortimer | ......................... | 5/99.1 |
| 4,685,725 A * | 8/1987 | Helfrich | .......................... | 297/45 |
| 5,076,390 A * | 12/1991 | Haskins | ..................... | 280/250.1 |
| 5,172,435 A * | 12/1992 | Griffin et al. | ...................... | 5/95 |
| 5,290,050 A * | 3/1994 | Kim | ................................ | 280/42 |
| 5,291,623 A * | 3/1994 | Artz | ................................ | 5/93.1 |
| 5,517,707 A * | 5/1996 | LaMantia | .......................... | 5/97 |
| 5,544,864 A * | 8/1996 | Gabriel-Lacki et al. | ......... | 256/25 |
| 5,560,636 A * | 10/1996 | Chen | ................................ | 280/642 |
| 5,568,933 A * | 10/1996 | Mizuno | ........................... | 280/42 |
| 5,741,020 A * | 4/1998 | Harroun | .......................... | 280/42 |
| 5,970,539 A * | 10/1999 | McDermott et al. | ............. | 5/98.1 |
| 5,984,406 A * | 11/1999 | Lee | ............................... | 297/16.2 |
| 6,082,813 A * | 7/2000 | Chen | ............................... | 297/16.2 |
| 6,113,181 A * | 9/2000 | Tang | ............................... | 297/27 |
| 6,148,456 A * | 11/2000 | Tharalson et al. | ............... | 5/99.1 |
| 6,149,238 A * | 11/2000 | Tsai | .......................... | 297/411.43 |
| 6,155,579 A * | 12/2000 | Eyman et al. | .................... | 280/30 |
| 6,209,951 B1 * | 4/2001 | Han | ................................ | 297/45 |
| 6,231,119 B1 * | 5/2001 | Zheng | ........................... | 297/16.2 |
| 6,247,748 B1 * | 6/2001 | Zheng | ........................... | 297/16.2 |
| 6,247,749 B1 * | 6/2001 | Yu | ................................ | 297/16.2 |
| 6,264,271 B1 * | 7/2001 | Munn et al. | ...................... | 297/45 |
| 6,276,548 B1 * | 8/2001 | Mitchell | .......................... | 220/9.4 |
| 6,343,390 B1 * | 2/2002 | Yang et al. | ....................... | 5/99.1 |
| 6,354,619 B1 * | 3/2002 | Kim | ................................ | 280/651 |
| 6,421,850 B1 * | 7/2002 | Welsh, Jr. | ......................... | 5/99.1 |
| 6,428,033 B1 * | 8/2002 | Harrison et al. | .............. | 280/644 |
| 6,438,773 B1 * | 8/2002 | Hsia | ................................ | 5/99.1 |

(Continued)

*Primary Examiner* — Hau Phan
*Assistant Examiner* — Jacob Meyer

(57) ABSTRACT

The present invention relates to collapsible cribs. The cribs have one or more of the following characteristics: adjustable length and/or, width and/or height, lightweight, easily collapsed, very compact when collapsed and easily carried, stored and transported. Embodiments disclosed relate to pens, cribs, and play yards with and without wheels.

17 Claims, 22 Drawing Sheets

U.S. PATENT DOCUMENTS

| | | | |
|---|---|---|---|
| 6,550,082 B2* | 4/2003 | Tharalson et al. | 5/95 |
| 6,715,824 B2* | 4/2004 | Zheng | 297/16.2 |
| 6,736,450 B2* | 5/2004 | Miyagi | 297/16.2 |
| 6,776,433 B2* | 8/2004 | Harrison et al. | 280/647 |
| 6,929,230 B2* | 8/2005 | Tsai | 248/436 |
| 6,938,911 B1* | 9/2005 | Shyu et al. | 280/250.1 |
| 7,036,161 B2* | 5/2006 | Harrison et al. | 5/99.1 |
| 7,043,779 B2* | 5/2006 | Mendenhall et al. | 5/99.1 |
| 7,077,422 B2* | 7/2006 | Haury et al. | 280/647 |
| 7,229,131 B2* | 6/2007 | Chen | 297/217.4 |
| 7,258,361 B2* | 8/2007 | Haury et al. | 280/649 |
| 7,418,746 B2* | 9/2008 | Gehr et al. | 5/99.1 |
| 7,472,921 B2* | 1/2009 | Harrison et al. | 280/647 |
| 7,503,085 B2* | 3/2009 | Harrison et al. | 5/99.1 |
| 7,509,695 B2* | 3/2009 | Zheng | 5/116 |
| 7,568,243 B2* | 8/2009 | Gehr et al. | 5/99.1 |
| 7,739,759 B2* | 6/2010 | Mendes et al. | 5/93.1 |
| 7,882,579 B2* | 2/2011 | Jackson et al. | 5/93.1 |
| 2002/0070532 A1* | 6/2002 | Harrison et al. | 280/647 |
| 2002/0084627 A1* | 7/2002 | Harrison et al. | 280/647 |
| 2003/0070229 A1* | 4/2003 | Hsia | 5/95 |
| 2003/0154547 A1* | 8/2003 | Hsia | 5/99.1 |
| 2004/0187207 A1* | 9/2004 | Hsia | 5/93.1 |
| 2005/0034232 A1* | 2/2005 | Martin | 5/95 |
| 2005/0166316 A1* | 8/2005 | Gehr et al. | 5/99.1 |
| 2006/0000018 A1* | 1/2006 | Harrison et al. | 5/99.1 |
| 2006/0021137 A1* | 2/2006 | Waldman et al. | 5/99.1 |
| 2006/0174406 A1* | 8/2006 | Yang | 5/99.1 |
| 2006/0197314 A1* | 9/2006 | Harrison et al. | 280/647 |
| 2007/0017025 A1* | 1/2007 | Myer | 5/99.1 |
| 2007/0102901 A1* | 5/2007 | Murayama | 280/642 |
| 2007/0145723 A1* | 6/2007 | Kamara | 280/647 |
| 2007/0252416 A1* | 11/2007 | Park et al. | 297/16.2 |
| 2008/0042473 A1* | 2/2008 | Dickie et al. | 297/16.1 |
| 2008/0042474 A1* | 2/2008 | Dickie et al. | 297/16.2 |
| 2009/0134603 A1* | 5/2009 | Harrison et al. | 280/647 |
| 2009/0194975 A1* | 8/2009 | Harrison et al. | 280/649 |

* cited by examiner

COLLAPSIBLE CRIB

CROSS REFERENCE TO RELATED APPLICATION

This application is a sixth Continuation-in-Part of parent U.S. patent application Ser. No. 09/642,948 filed on Aug. 22, 2000—now U.S. Pat. No. 6,428,033 and a second Continuation-in-Part U.S. patent application Ser. No. 10/014,125 filed on Dec. 11, 2001—now U.S. Pat. No. 6,776,433 and a Continuation-in-Part U.S. patent application Ser. No. 11/22,1079 filed Sep. 8, 2005 now U.S. Pat. No. 7,503,085.

FIELD OF THE INVENTION

The present invention relates to collapsible cribs. The cribs have one or more of the following characteristics: adjustable length and/or, width and/or height, lightweight, easily collapsed, very compact when collapsed and easily carried, stored and transported. Embodiments disclosed relate to pens, cribs, and play yards with and without wheels.

BACKGROUND OF THE INVENTION

Baby Beds, Cribs, Play Pens, Play Yards, etc.

This invention relates generally to walled collapsible structures like baby beds and including devices that act as cribs, playpens or play yards and the like.

Traveling or camping with babies and very young children is often very difficult because a large amount of equipment is necessary to provide for the baby or young child. While it is known that certain devices may be collapsed for easier transport, many of these devices are still relatively difficult to store in a relatively small space. In addition, many or these devices are heavy, making it difficult to carry all of the necessary items for supporting the baby or young child.

For example, while collapsible playpens or play yards are known, they generally include a relatively heavy frame connected by hinges. The frame may be collapsed with some effort, and it is still necessary to transport the relatively heavy device from place to place. Moreover, as the size of the child increases the size and weight of the devices to accommodate them also tends to significantly increase. For a family traveling or camping with a baby or young child, this may mean not only must they transport the youngster, the youngster's clothing and food, but the heavy bed and perhaps playpen must be moved as well.

Another limitation on existing cribs, playpens and play yards is the size of baby or child that can be accommodated by the devices. A full size baby crib would generally be considered much to big for a new born infant and a bassinet obviously would be to small for a one or two year old child. Thus the need to purchase several different beds and playpens to accommodate a child's early sleeping and play needs.

Thus, there is a continuing need for a baby and young child's bed and/or confined play area which may be readily transported from place to place which may be easily set up at a new location, and which adequately protects the baby or young child. More over, it would be most desirable if one device could provide sleeping and play needs for the early periods of a child's life.

Thus, there is a continuing need for a baby and young child's bed and/or confined play area which may be readily transported from place to place which may be easily set up at a new location, and which adequately protects the baby or young child. More over, it would be most desirable if one device could provide sleeping and play needs for the early periods of a child's life.

In this specification we disclose solutions to the aforementioned problems related to baby beds, cribs, play pens, play yards, etc.

SUMMARY OF THE INVENTION

In this specification we describe a number of possible collapsible crib configurations and applications. All of the collapsible cribs contain one or more of the following elements: anti-torque posts, crossed support arms, complex crossed support arms, flexible Structure Locking Elements (SLE), Anti-Collapse Mechanisms (ACM), corner brackets with offsets for attachment of SLE and ACM telescoping crossed support arms detachable horizontal support bar assemblies, and telescoping horizontal support bar assemblies.

In the detailed description we describe how each of the aforementioned elements are constructed and operate in relation to cribs that collapse in at least two directions simultaneously. We disclose crib structures with fixed dimensions when opened and those whose dimensions can be altered. We disclose collapsible cribs with and without wheels. In the details we provide a number of specific application examples for the collapsible structures enumerated.

DETAILED DESCRIPTION OF PREFERRED EMBODIMENTS

Figure 1:
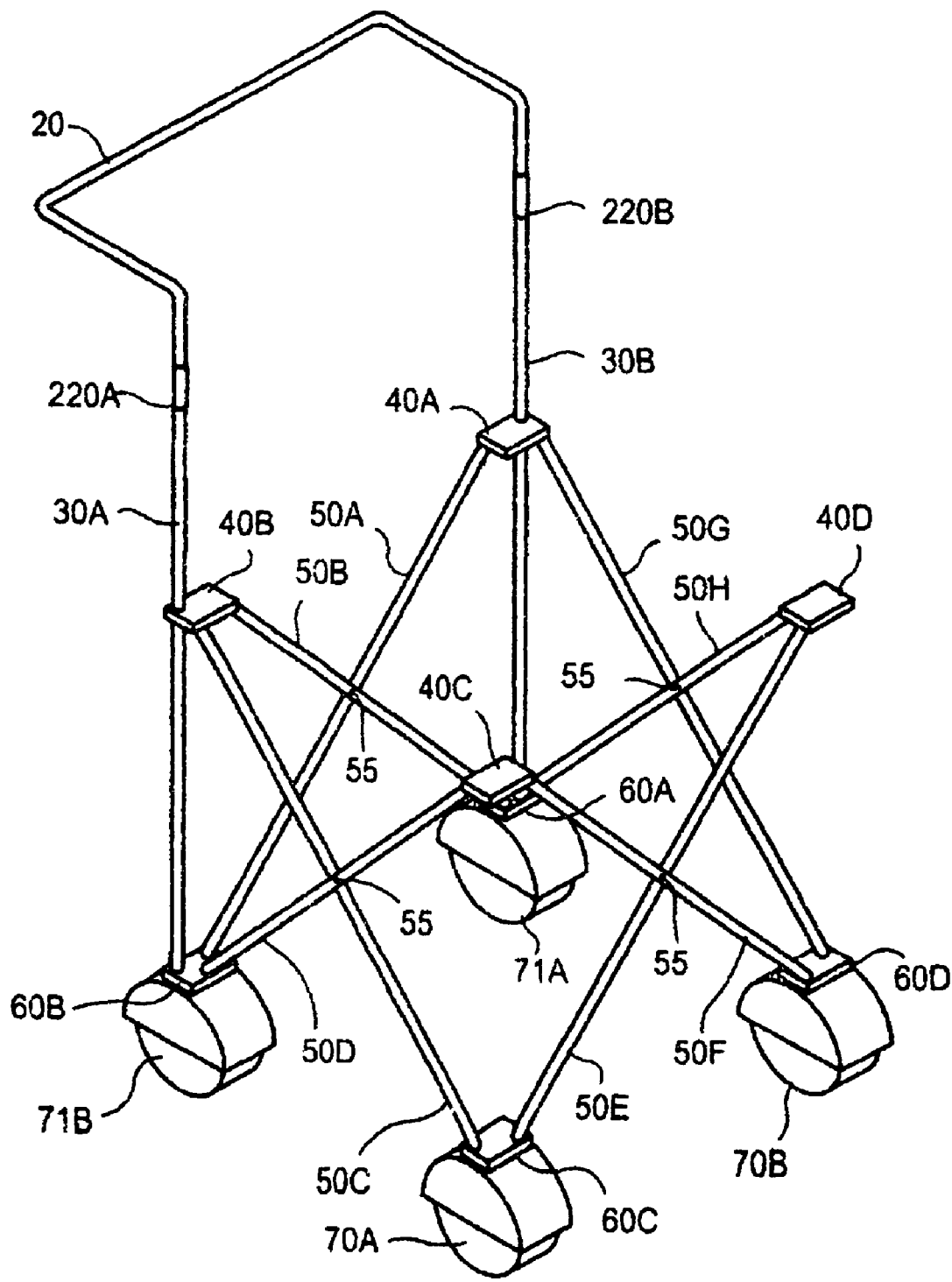
FIG. 1 is a perspective view of a basic collapsible four-sided cart frame.

In this specification like reference characters are used for like parts throughout the several views and similar parts at different locations are indicated by a letter following the part reference number. Thus for example, referring to FIG. 1 (This figure is also FIG. 1 from the parent application Ser. No. 09/642,948 filed on Aug. 22, 2000—now U.S. Pat. No. 6,428, 033—and hereafter referred to as "Parent") the four lower corner brackets 60A, 60B, 60C, and 60D may be referenced as individual brackets in this specification or when not referring to a specific bracket but rather the brackets in general as lower corner brackets 60. Also, in this specification the term "open" when used in connection with the description of a crib is meant to mean the crib in its functional or use configuration and "closed" is meant to mean the device in its collapsed or non-functional configuration. We define crib as an enclosure that will confine a child or animal within the area created by the crib walls when in the open position.

Turning now to a discussion of the drawings. FIG. 1 illustrates a collapsible frame having two bisecting pivotally connected at 55 crossed support arms, 50A and 50B, 50C and 50D, 50E and 50F and 50G and 50H, per side with all crossed support arms being of equal length, four lower corner brackets, 60A, 60B, 60C and 60D, four upper corner brackets, 40A, 40B, 40C and 40D, to which said support arms 50 are attached as illustrated. Also illustrated are four casters, 70A, 70B, 71A and 71B, one attached below each of lower corner brackets, 60A, 60B, 60C and 60D. FIG. 1 also illustrates two vertical posts 30A and 30B with quick disconnects 220A and 220B for a push bar 20.

It is from this basic collapsible frame structure that a number of crib embodiments are disclosed. Although we will disclose each of the new embodiments individually, it is our intent that the reader understand that many permutations and combinations of the new embodiments illustrated are possible.

Figure 2:
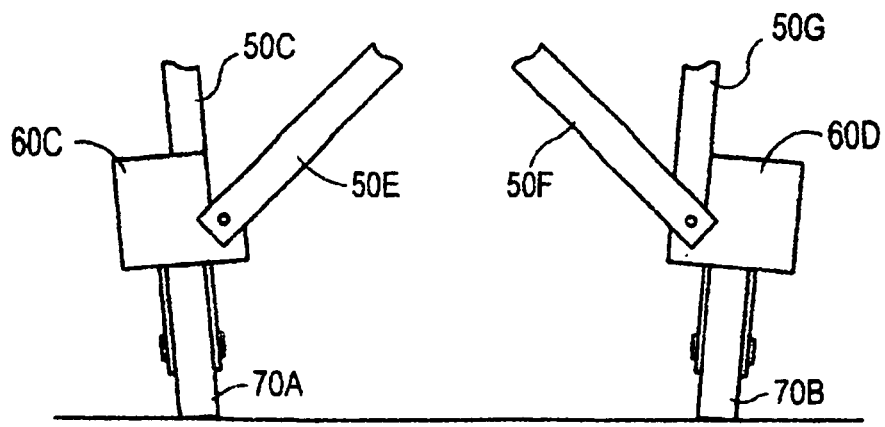
FIG. 2 illustrates the effect of a heavy weight applied to the cart frame without anti-torque posts.

We have found that when heavy loads are applied to the frame illustrated in FIG. 1, the front upper corner brackets 40C and 40D, and the front lower corner brackets, 60C and 60D will tend to move out of vertical alignment. This is a problem since the wheels 70A and 70B, are mounted directly below the corner brackets 60C and 60D and are thus also forced out of vertical alignment and render the wheel inoperative as illustrated in FIG. 2 (this figure is also FIG. 10A from U.S. patent application Ser. No. 10/014,125 filed on Dec. 11, 2001—now U.S. Pat. No. 6,776,433 a Continuation-in-Part of U.S. patent application Ser. No. 09/642,948 filed on Aug. 22, 2000—now U.S. Pat. No. 6,428,033 (hereafter referred to as CIP-1)) with a slight modification—[footrest attachment brackets 133A and 133B removed])

Figure 3:
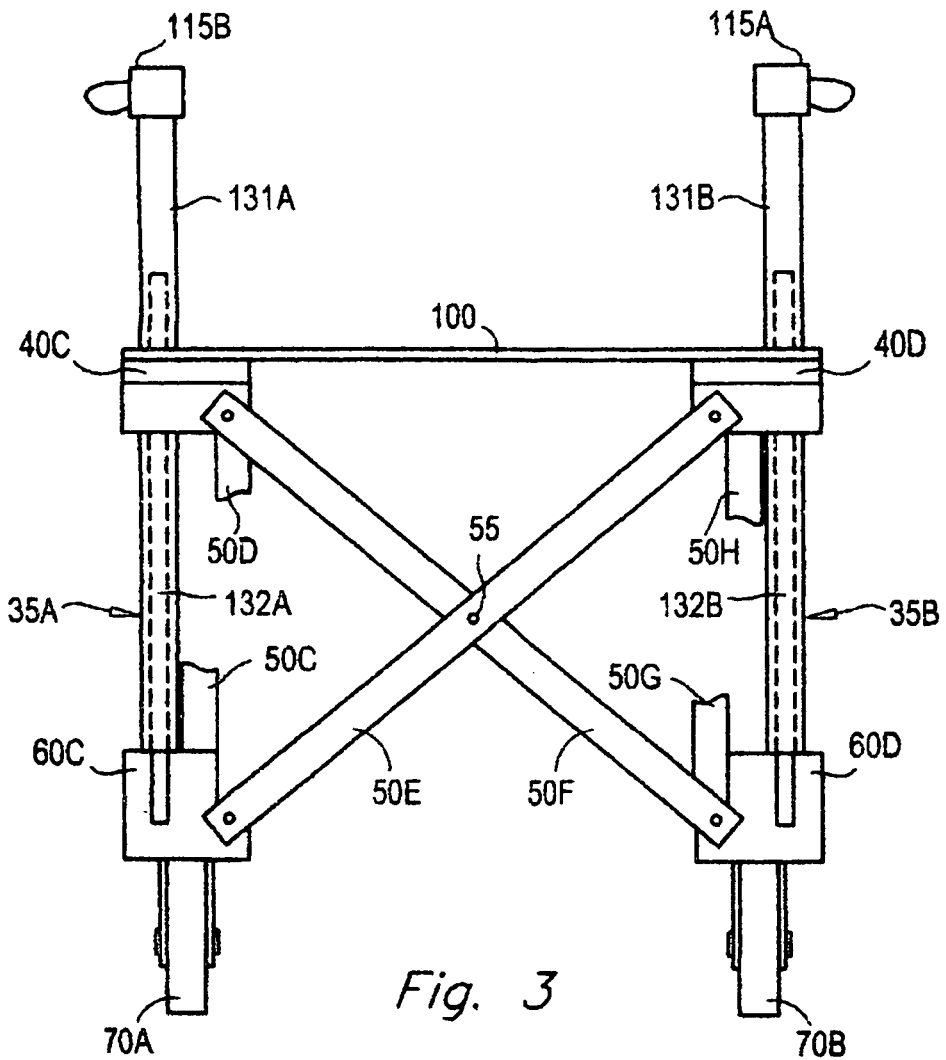
FIG. 3 is a cross sectional view of the front of a cart frame with anti-torque posts.
Figure 4:
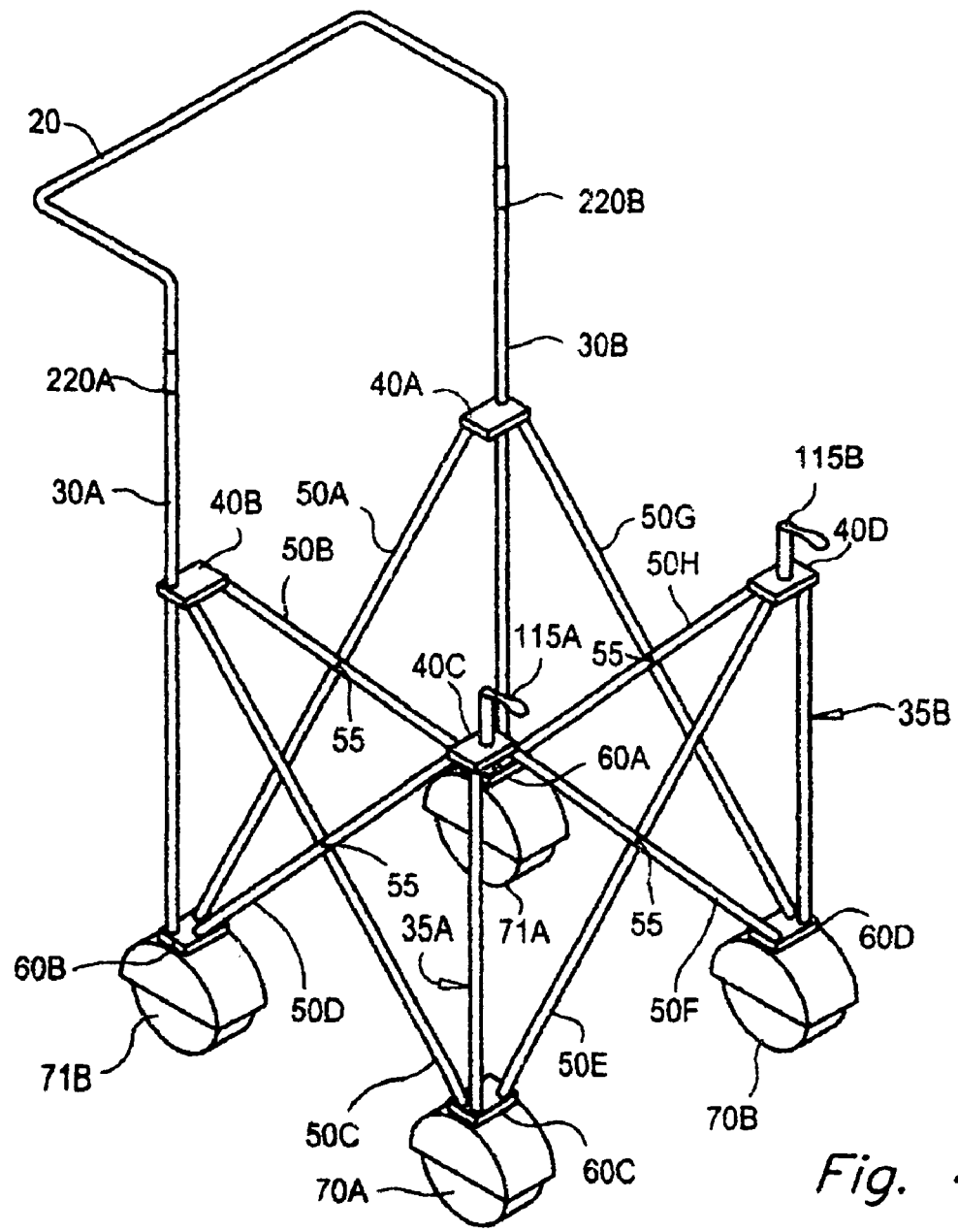
FIG. 4 is a perspective view of a collapsible four-sided cart frame with anti-torque posts.
Figure 10:
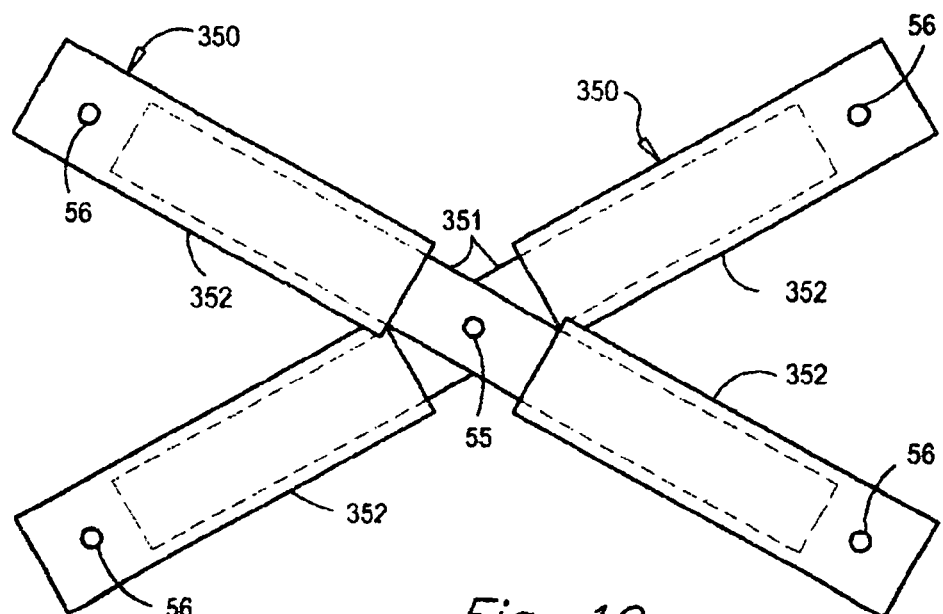
FIG. 10 illustrates the inner and outer tubular sections of a telescoping crossed support arm assembly of the type employed in this invention.
Figure 13:
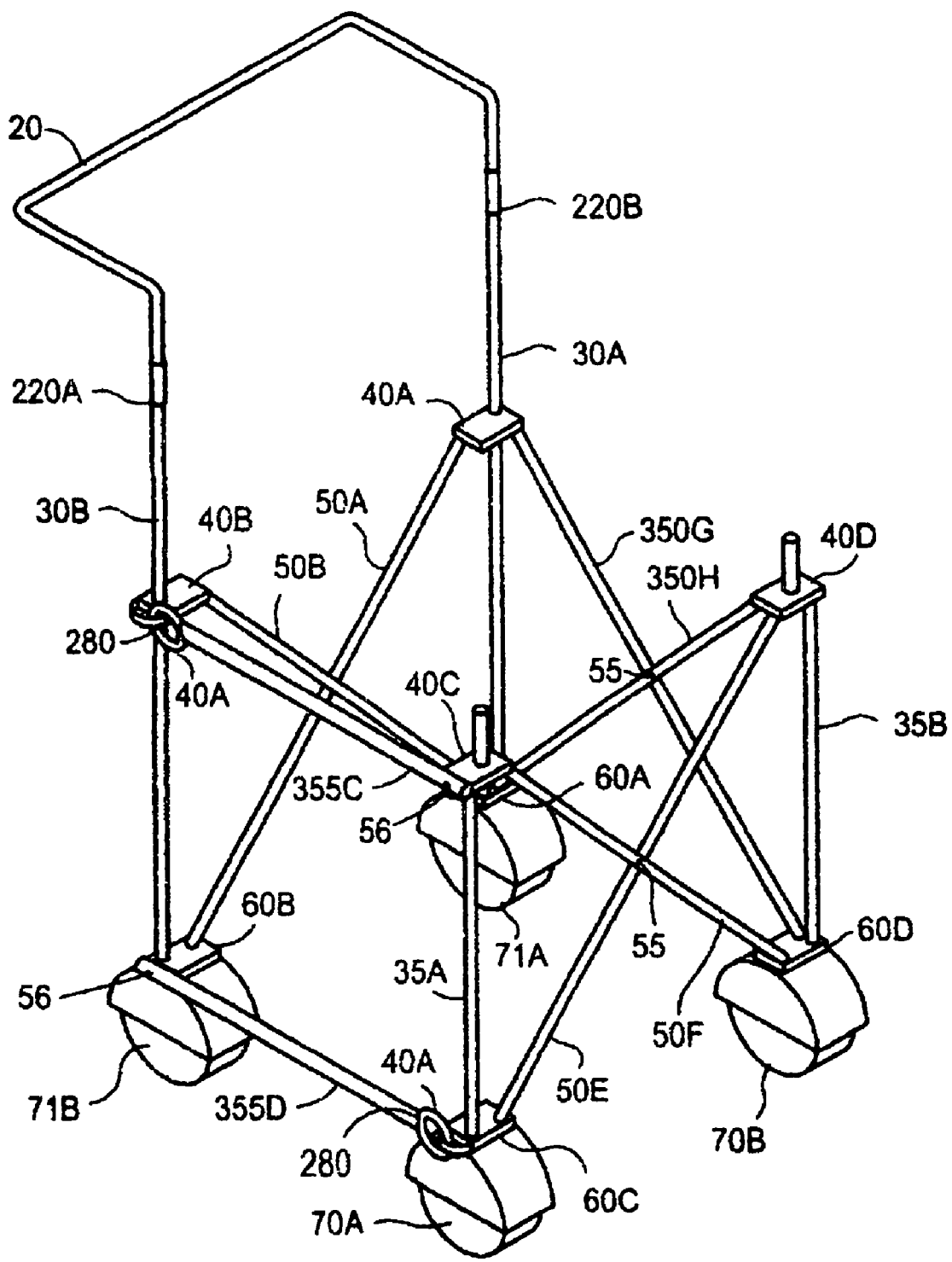
FIG. 13 illustrates an extendable collapsible cart having pivotally connected detachable telescoping horizontal support bar assemblies.

The solution for this problem is the addition of telescoping anti-torque posts 35A and 35B, as shown In FIG. 3 (This figure is also FIG. 10 of the CIP-1 with a slight modification—[hand grips 57, seat 100, and arm rests 105 have been removed]). FIG. 3 is a front cross sectional view of a wheeled frame front illustrated in FIG. 4. (this is also FIG. 4 from U.S. patent application Ser. No. 10/075,862 filed Feb. 13, 2002, now U.S. Pat. No. 7,036,161 which is a first Continuation-in-Part U.S. patent application Ser. No. 10/014,125 filed on Dec. 11, 2001—now U.S. Pat. No. 6,776,433 and of parent U.S. patent application Ser. No. 09/642,948 filed on Aug. 22, 2000—now U.S. Pat. No. 6,428,033 (hereafter referred to as CIP-1)). (It should be noted that similar telescoping anti-torque posts 35 are also illustrated in FIG. 13 of CIP-1). FIG. 4 is identical to FIG. 1 with the exception of the addition of two telescoping anti-torque posts, 35A and 35B. In this embodiment as illustrated in FIG. 3, two telescoping vertically aligned anti-torque posts, 35A and 35B, are comprised of lower posts, 132A and 132B attached to the two lower front corner brackets 60C and 60D. A second set of hollow slidable posts 131A and 131B are positioned over lower posts 132A and 132B. In the preferred embodiment of this invention the upper ends of 132A and 132B are connected the upper front corner brackets 40C and 40D and in another embodiment of the invention illustrated in FIG. 3, the upper posts 131A and 131B extend through the upper front corner brackets 40C and 40D and are slidable within those brackets.

The system shown in FIG. 3 solves the caster twisting technical problem by preventing such torque distortion. This is accomplished by adding vertical telescoping anti-torque posts assemblies 35A and 35B that keep the upper and lower front corner brackets 40C and 40D and 60C and 60D in vertical alignment. In turn, this is because the torque forces are less than the vertical force of anti-torque posts 35A and 35B. Anti-torque post assemblies can be used on each corner of a crib.

In a preferred embodiment of the invention, the lower sections 132A and 132B (see FIG. 3) of the telescoping anti-torque posts 35A and 35B have the smaller diameter and slide inside the larger diameter sections 131A and 131B that are on top. It is known, however, that the reverse orientation could have been applied. In addition, the inside posts may be of hollow or solid construction.

The length of the lower sections of the telescoping anti-torque posts, 132A and 132B, is such that these posts have a considerable overlap with the front upper sections of the anti-torque posts, 131A and 131B, when the device is in the collapsed position such that they will not be easily separated. Thus, a portion of the interior sections 132A and 132B are always contained within the upper outer sections 131A and 131B. For the first time in the art of crib design this telescoping system makes it possible to use a flexible or removable crib frame support structure and maintain the casters in alignment during use and still have a collapsible crib closing simultaneously in the X and Y direction.

Turning now to the Structure Locking Element embodiment that we will also refer to as SLE. For easy of understanding we have defined the SLE as the component element which when attached at or to the four upper corner brackets and/or at or to the four lower corner brackets holds the frame in a rigid fixed open position. The SLE keeps the frame in its desire upright position and prevents it from collapsing to the floor in the absence of a cross members such as the push bar 20 in FIG. 1.

SLEs can be of many shapes, sizes and materials and can be attached to or at the corner brackets in many ways. We will attempt to provide a number of general examples, however, these should not be considered as an all inclusive list, but rather only as examples of the embodiment.

EXAMPLE 1

Figure 5:
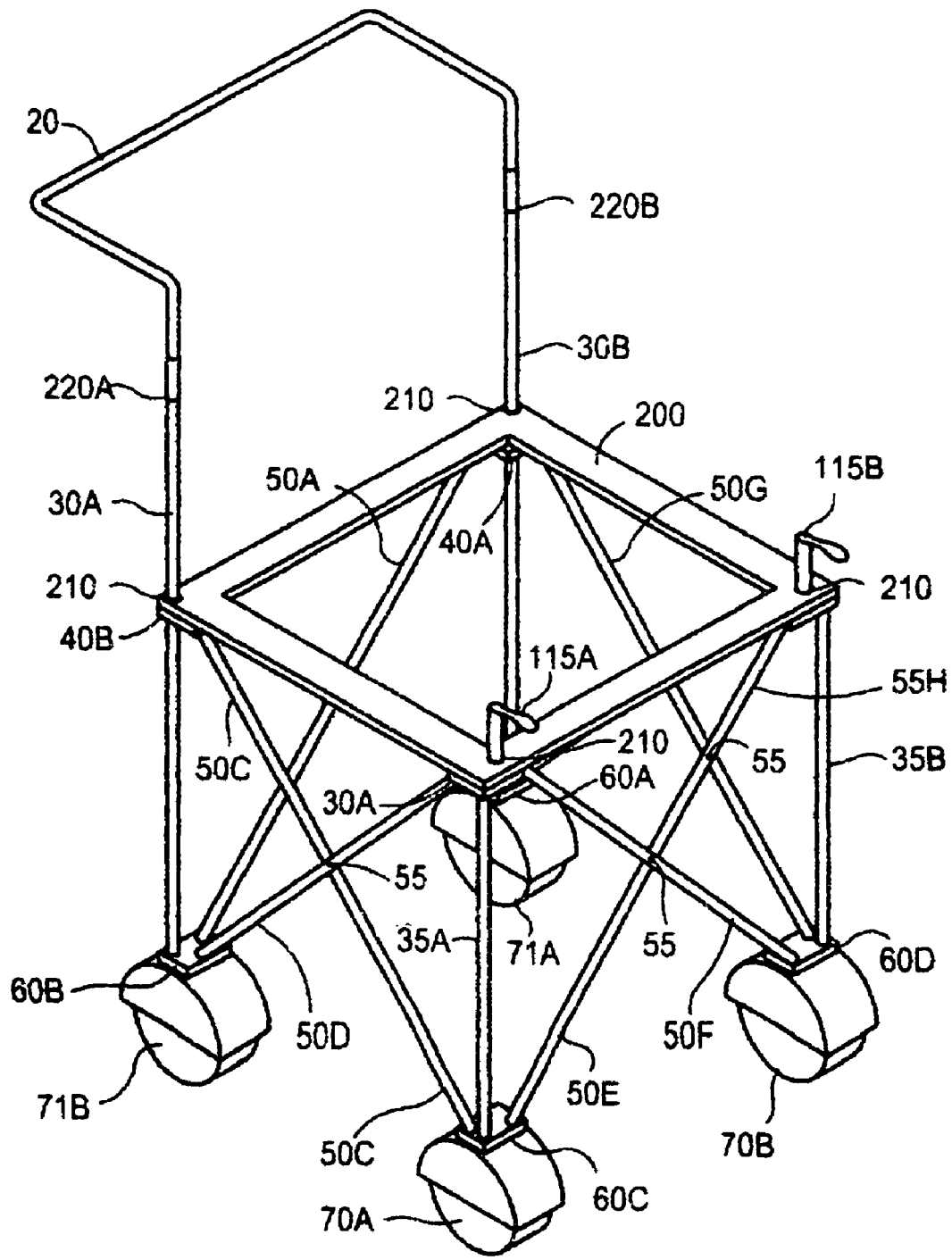
FIG. 5 illustrates a flexible Structure Locking Element attached by grommets to vertical posts passing through corner brackets.

We start with a variation on a well known form of SLE, the seat for a camping chair. In this example we illustrate a SLE made of a flexible material such materials as webs, belts, fabric, rope, etc. FIG. 5 (FIG. 7 from CIP-2), that is identical to FIG. 4 except for the addition of a flexible SLE 200 made of a nylon web, illustrates the corners of the SLE attached at the upper corner brackets 40A, 40B, 40C and 40D. In this example the SLE 200 is in the shape of a square because all of the crossed support arms are of equal length and thus by definition must form a square when open. In FIG. 5 we have illustrated grommets 210 placed in the four corners of the nylon web SLE 200 and the corner grommets 210 sliding over the rear vertical posts, 30A and 30B, and over the telescoping anti-torque posts, 35A and 35B. Thus the frame in FIG. 5 is held in a rigid fixed open position.

At this point it is important to mention that although the SLEs 200 we discuss in this and the following examples are for frames having square openings in upper or lower corner brackets, the principles will also be applicable to other shaped openings such as triangular, rectangular and pentagon shaped frame embodiments that we will disclose later in the specification.

EXAMPLE 2

Although this example uses a fabric web similar to that in Example 1, it differs significantly in that the SLE is offset inside the frame. This is very important when side walls are attached to the SLE since the offset prevents children and animals from striking or touching the collapsible frame when incorporated into play pens, cribs, and animal crates.

Figure 6:
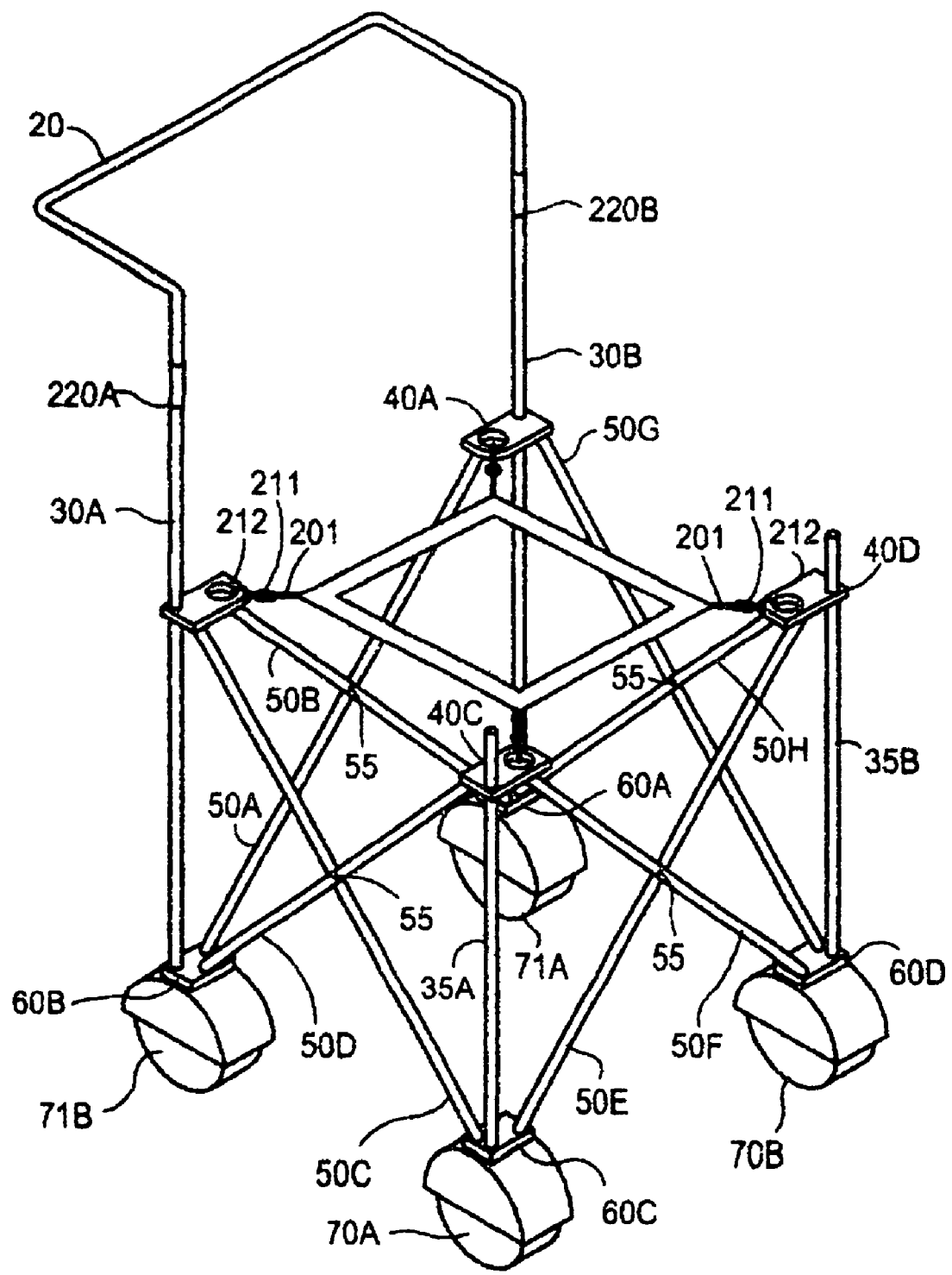
FIG. 6 illustrates a flexible Structure Locking Element attached by shackles to upper corner brackets.
Figure 7:
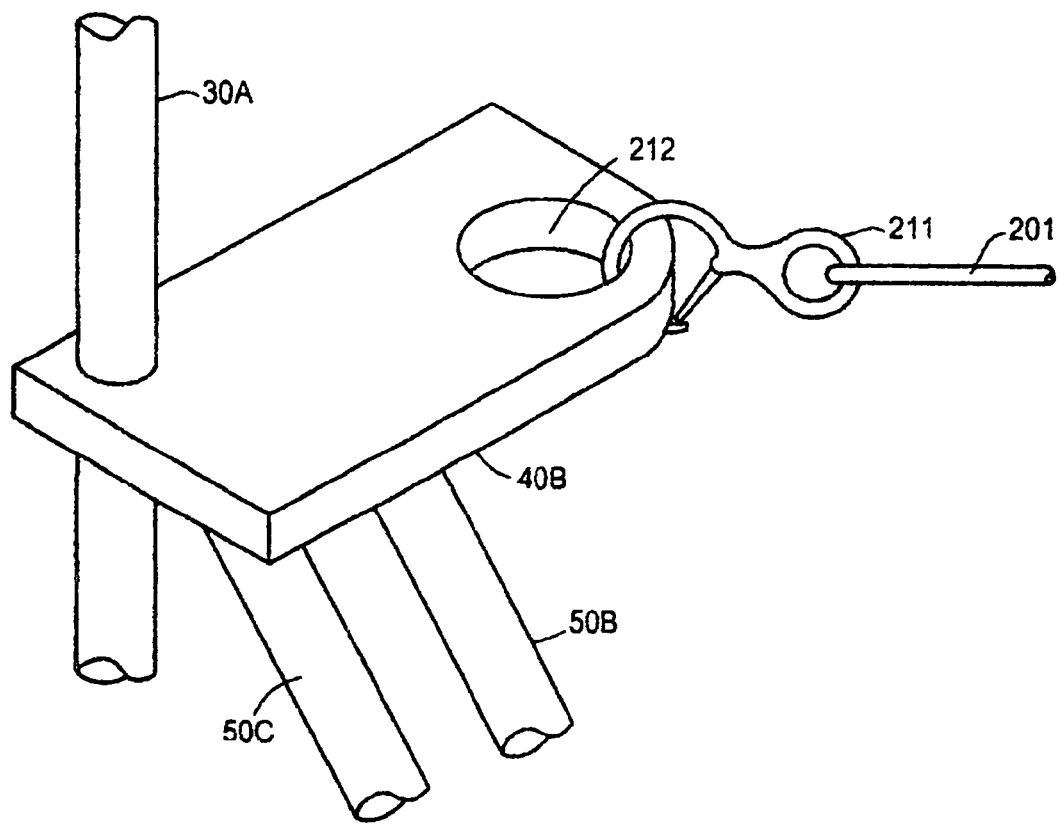
FIG. 7 illustrates a corner bracket modification to permit attachment of Structure Locking Elements from inside the collapsible frame structure.
Figure 9:
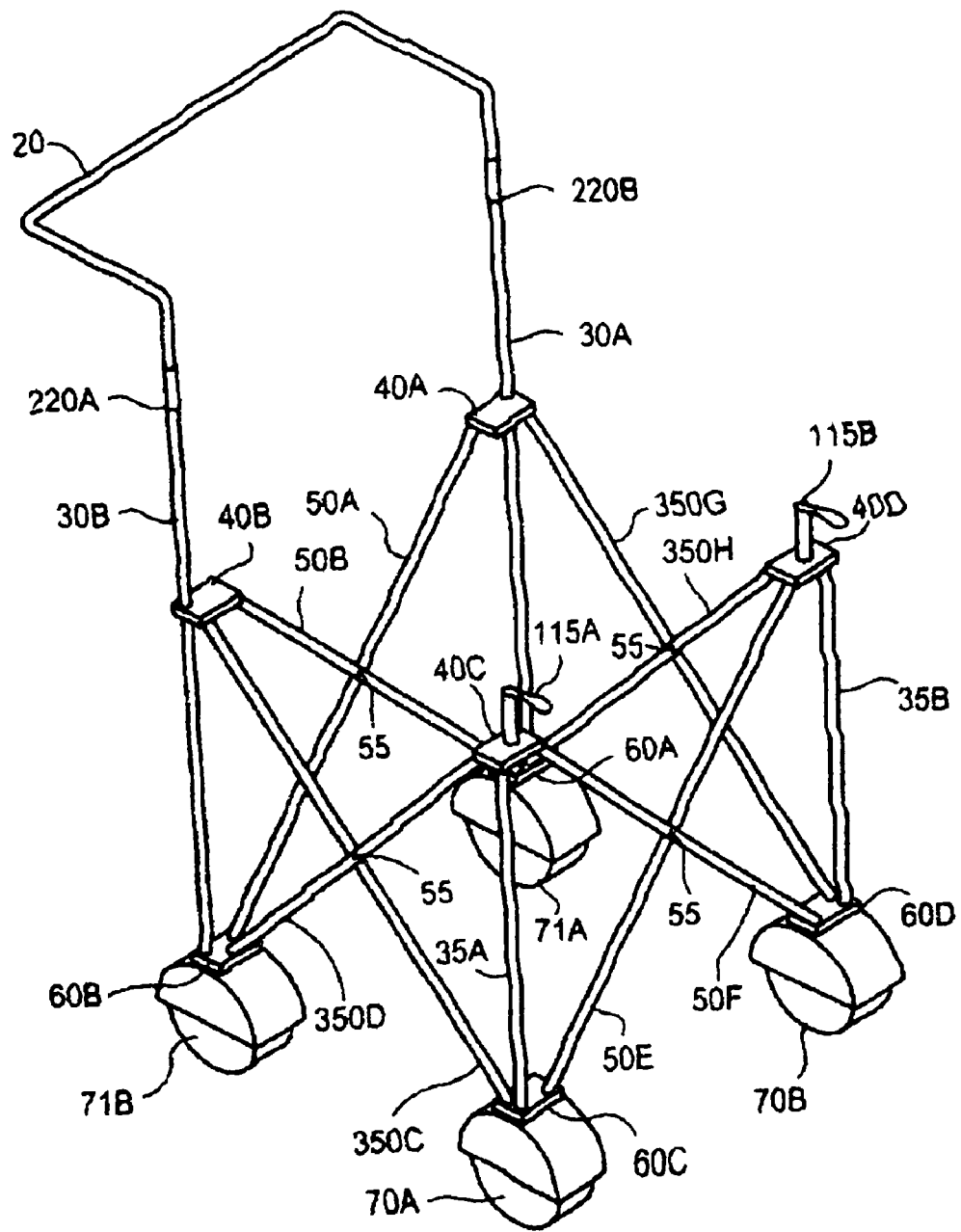
FIG. 9 illustrates telescoping crossed support arm assemblies that are used to adjust the length of a cart.

This new offset flexible SLE 202 is illustrated in FIG. 6 (FIG. 9 in CIP-2. In FIG. 6 the flexible nylon web SLE 202 is attached to each of the upper corner brackets 40 by means of shackles 211. In this example, the upper corner brackets 40A, 40B, 40C and 40D have been modified as illustrated in FIG. 7 (FIG. 10 in CIP-2), which is an enlarged view the area around the upper corner bracket 40B, so as to have a ring 212 upon which to clip the shackles 211. The shackles are attached to straps 201 which are attached to the outside corners of a flexible nylon web thus forming the SLE 202.

Figure 8:
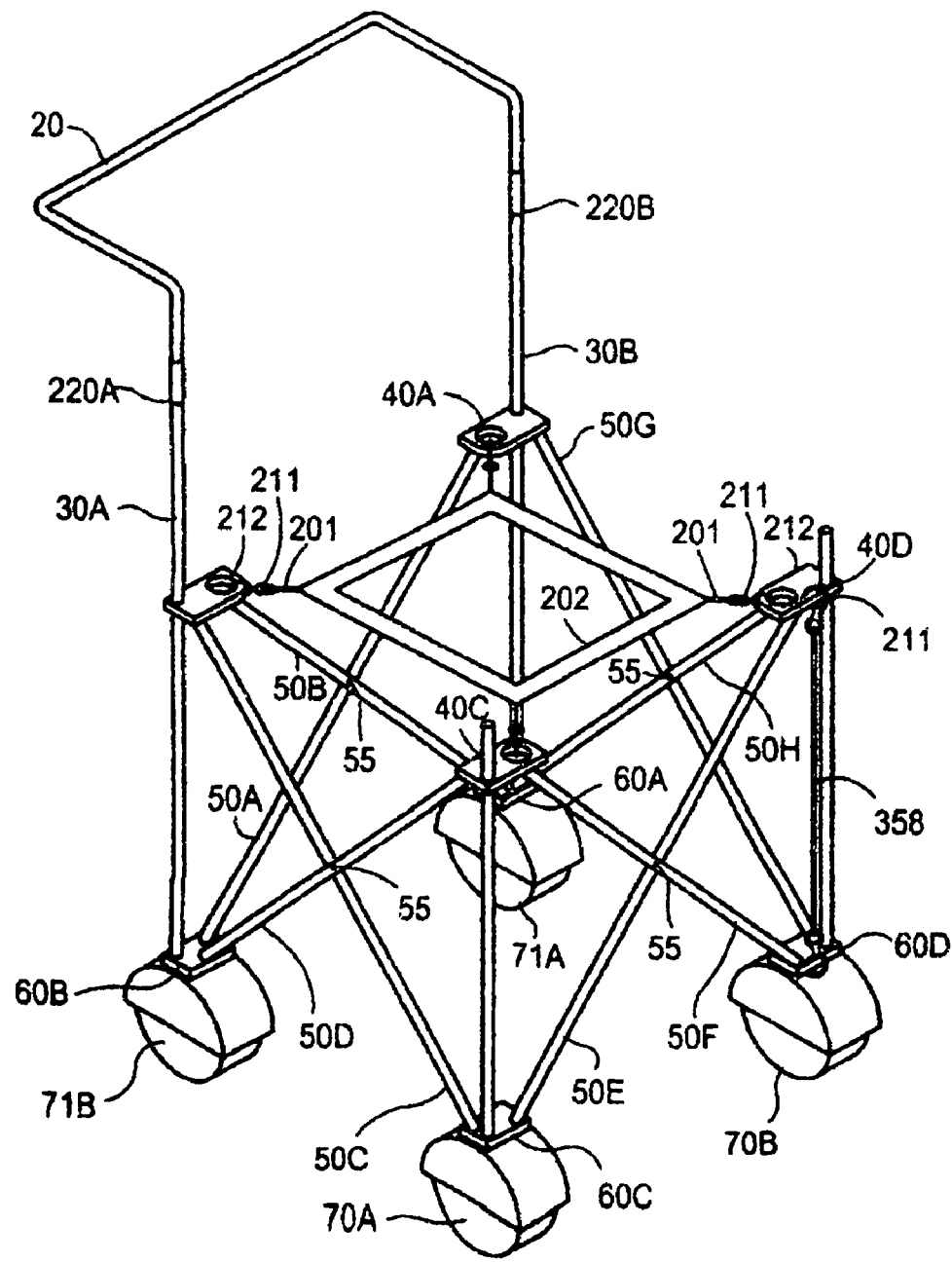
FIG. 8 illustrates a collapsible frame with an Anti Collapse Locking Mechanism attachment.

Turning now to another new embodiment that we define as the "Anti-Collapse Locking Mechanism" or ACLM. We use FIG. 8 (FIG. 15 in CIP-2) to introduce the concept of a flexible Anti-Collapse Locking Mechanism. In FIG. 8, shackles 211 are attached to each end of a nylon belt 139. One shackle 211 on the end of the nylon belt is clipped to the clip ring 212 in upper corner bracket 40D previously described in FIG. 7. A similar clip ring 212 has been incorporated into the lower corner bracket 60D and the other shackle 211 is clipped to the lower corner bracket 60D thus preventing the structure from collapsing should upward, downward or sidewise pressure be applied to the upper SLE 202. For cribs it is most desirable to lock the collapsible frame in an open position with an ACLM to prevent accidentally collapsing the frame and causing injury should a child push on a SLE.

Any rigid or flexible means or structure can be used to create an ACLM as long as it prevents the upper and lower corner brackets from separating and thus collapsing the frame while the device is in an open position. For example, ACLM's may be incorporated into rigid vertical posts, flexible sidewalls of a crib or as separate members as demonstrated by the nylon strap 139 in FIG. 8.

In yet another embodiment of the invention we disclose how to adjust at least one dimension (length, width, or height) of the basic collapsible frame illustrated in FIG. 4. FIG. 9 (FIG. 16 in CIP-2), illustrates adjustability in the front to back direction. In FIG. 9, the crossed support arms 50C and 50D and 50G and 50H shown in FIG. 4 have been replaced by two pair of pivotally connected telescoping crossed support arm assemblies 350C and 350D and 350G and 350H. FIG. 10 (FIG. 17 in CIP-2), illustrates a pair of telescoping crossed support arm assemblies 350 where each support arm is essentially identical with its pivotally bound counter part and each crossed support arm is comprised of an intermediate tubular section 351 and a pair of outer tubular sections 352 that telescope opposite ends into and out of said intermediate section 351. The telescoping crossed support arms in FIG. 17 are illustrated as having hollow intermediate tubular sections 351 and outer tubular sections 352, however, either the outer or the inner sections may be solid and the sections may slide over each other in either direction.

Figure 11:
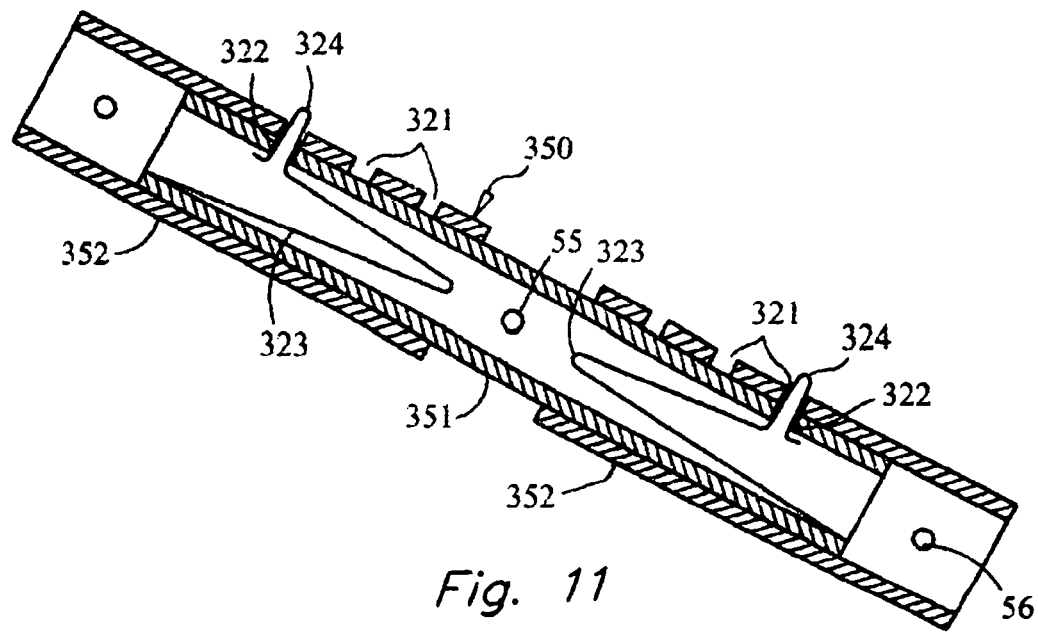
FIG. 11 illustrates a mechanism for locking the inner and outer telescoping tubular sections of the crossed support arm assemblies at points equal distance from the point of intersection of the two cross support arms.

The point where the telescoping support arms 350 bisect each other and are pivotally connected is shown as 55. The point where each crossed support arm 350 is pivotally connected to an upper or lower corner bracket 40 or 60 is shown as 56. FIG. 11 (FIG. 18 in CIP-2) illustrates a means for locking all of the outer telescoping tubular sections 352 at positions equal distance to the pivotal connection point 55. Each outer tubular section 352 has formed therein a plurality of longitudinally spaced holes 321. Said holes 321 are spaced identically for each of the outer tubular sections 352 and on both sides. Thus assuring that the pivotal connection point 55 for each pair of crossed support arms 350 remains centered within the side defined by a string stretched around the outmost ends of the four outer tubular sections 352 and because opposite sides are also identical, the opposite side is also centered in an identical position. Each intermediate tubular section 351 has a hole 322 formed therein similar to hole 321. A hairpin or V-shaped leaf spring 323 is housed in the inner end of each tubular section 351 and compressed between the opposing inside faces of tubular proximate holes 322. One of the legs of each leaf spring 323 is provided with a radially projecting button 324 terminating in a rounded end and slidable engaging hole 322 and a selected axially aligned hole 321 to releasably lock intermediate tubular section 351 and respective tubular elements 352 and thus releasably lock crossed support arm assemblies 350 at a desired adjusted length.

Figure 12A:
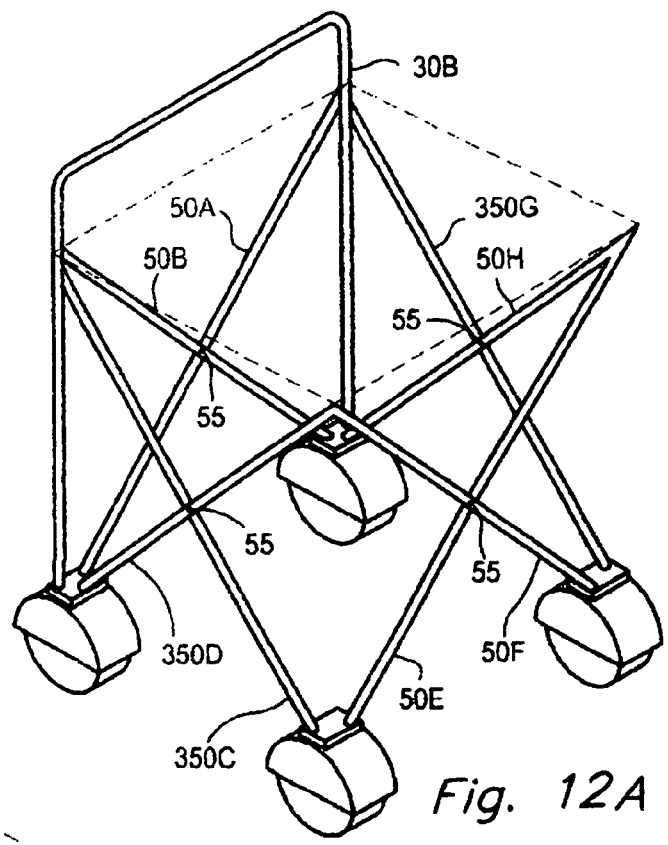
FIG. 12A is a schematic illustration with telescoping crossed support arm assemblies unextended.
Figure 12B:
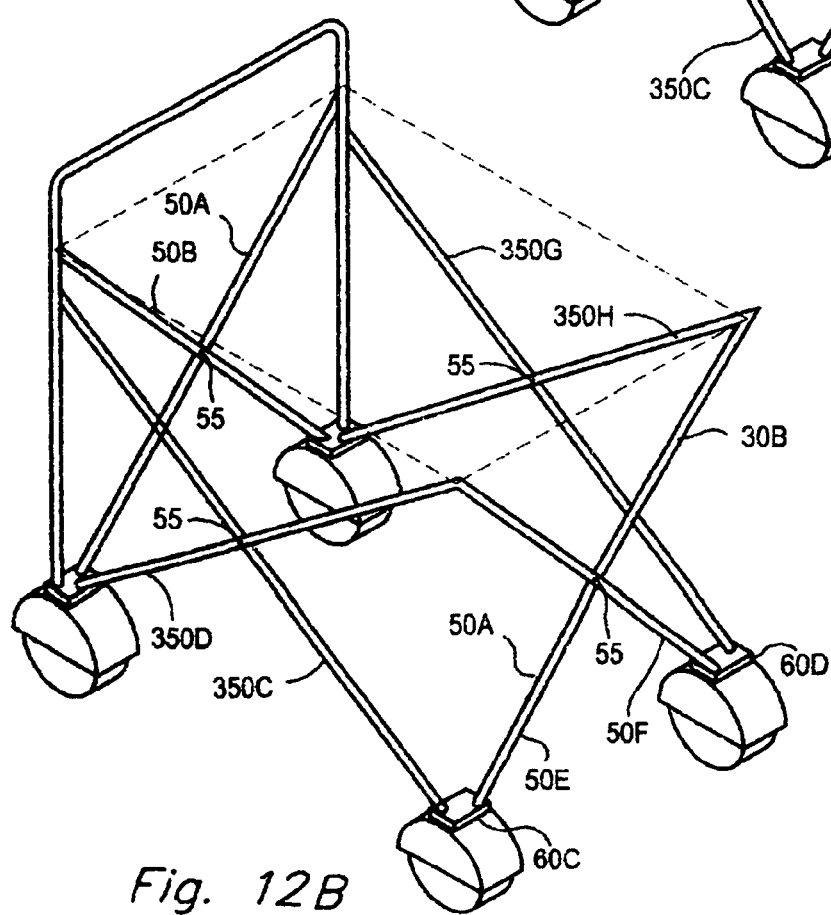
FIG. 12B illustrates the cart of 19A with telescoping crossed support arm assemblies extended.
Figure 16:
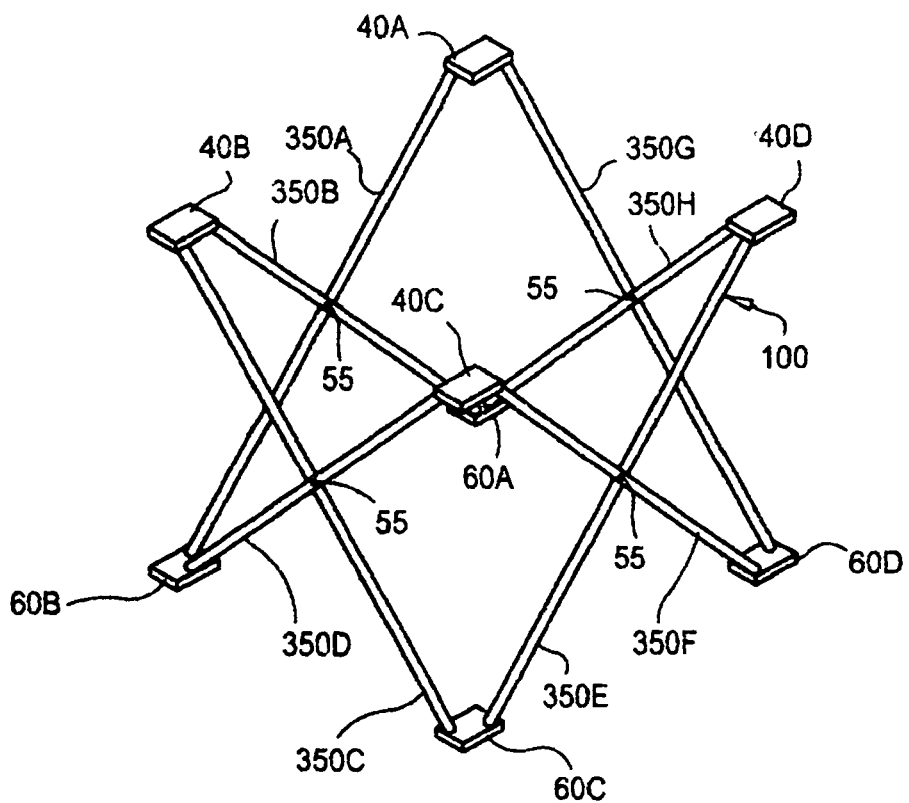
FIG. 16 illustrates an extendable collapsible crib frame.

FIG. 12A (FIG. 19A in CIP-2) is a schematic illustration of the collapsible frame in FIG. 16 with the telescoping crossed support arm 350C and 350D and 350G and 350H in a non-extended position. FIG. 12B (FIG. 19B in CIP-2) shows the same frame with telescoping crossed support arm assemblies 350C and 350D and 350G and 350H extended. Thus, by extending all of the telescoping opposite side crossed support arms (this keeps the bisecting points of the two sides of the collapsible frame centered) the length of the collapsible frame can be extended without changing the height or width. The width of a cart and or crib can also be adjusted by applying the same principle of telescoping crossed support arms to the front side and back side. Likewise, the length and the width can both be adjusted independently of each other on the same collapsible frame by using telescoping crossed support arm pairs on all sides of a of the frame. Moreover, a frame's height can also be raised or lowered while keeping the same width and length through the use of telescoping crossed support arm pairs on all sides.

In yet another embodiment of the invention an adjustable collapsible frame FIG. 13 (FIG. 20 in CIP-2) illustrates a collapsible frame having telescoping crossed support arm assemblies 350G and 350H on one side and pivotally connected detachable telescoping horizontal support bar assemblies 355C and 355D on the other side.

As illustrated in FIG. 13, the detachable telescoping horizontal support bar 355C is pivotally connected to front upper corner bracket 40C at 56 and has a snap fitting 280 mounted on the other end in order to quickly connect and disconnect from the front upper corner bracket 40B. The other detachable telescoping support bar 355D is pivotally connected to front lower corner bracket 60B and has a snap fitting 280 mounted on the other end in order to quickly connect and disconnect from the front lower corner bracket 60C. The rear upper corner bracket 40B and the front lower corner bracket 60C have been modified to include a ring into which the snap fittings 280 can be connected. The pivotally connected detachable telescoping horizontal support bar assemblies 355C and 355D telescope in a manner similar to that previously described for an intermediate and outer section of a telescoping crossed support arm. It should be noted that although not illustrated in a figure, the detachable horizontal support bars 355C and 355D can also be constructed of a single rigid member that is of a corresponding predetermined length to form a unique desired frame configuration for the collapsible frame in an open position.

Figure 14:
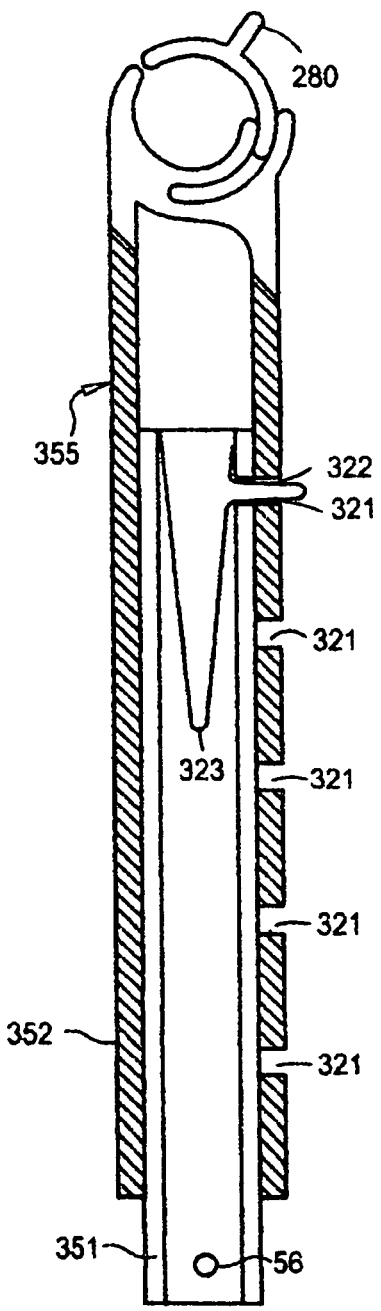
FIG. 14 illustrates a pivotally connected detachable telescoping horizontal support bar.

FIG. 14 (FIG. 21 in CIP-2), illustrates the pivotally connected telescoping support bar 355 in FIG. 13. Each support bar has an inner tubular section 351 that slides within an outer tubular section 352. The outer tube 352 has formed therein a plurality of longitudinally spaced holes 321. Said holes 321 are spaced to create a predetermined bar length. The intermediate tubular section intermediate tubular section 351 has a hole 322 formed therein similar to hole 321. A hairpin or V-shaped leaf spring 323 is housed in the inner end of each tubular section 351 and compressed between the opposing inside faces of tubular proximate holes 322. One of the legs of each leaf spring 323 is provided with a radially projecting button 324 terminating in a rounded end and slidable engaging hole 322 and a selected axially aligned hole 321 to releasably lock intermediate tubular section 351 and respective tubular element 352 and thus releasably lock the telescoping horizontal support bar 355 in a fixed position. Predetermined bar lengths are established to keep the frame in a rectangular shape, thus keeping an equal distance between upper corner brackets 40C and 40B and 40A and 40D and lower corner brackets 60A and 60D and 60C and 60B.

Figure 15A:
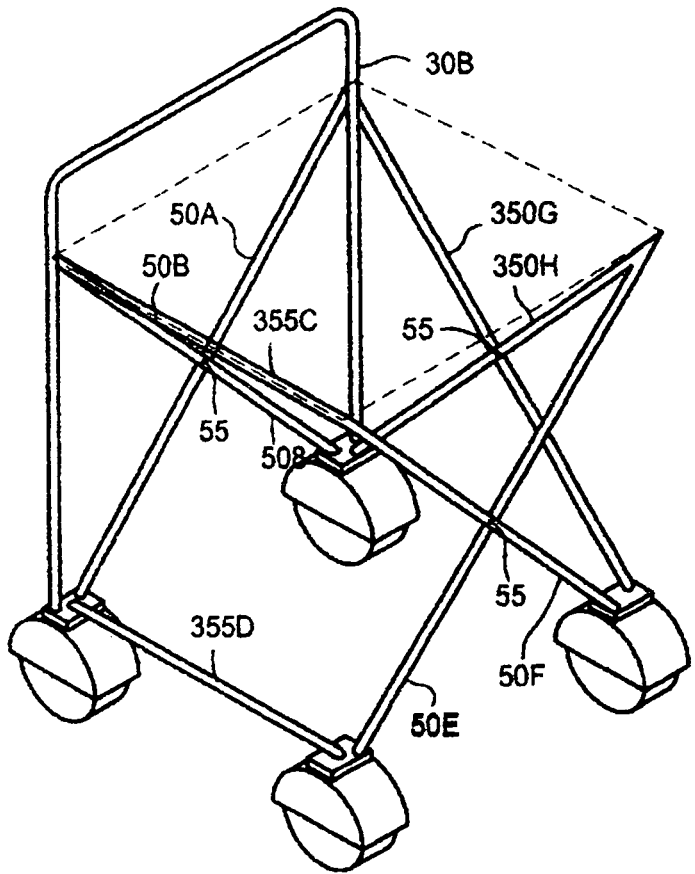
FIG. 15A is a schematic illustration of a cart having pivotally connected detachable telescoping horizontal support bar assemblies in an open but unextended position.
Figure 15B:
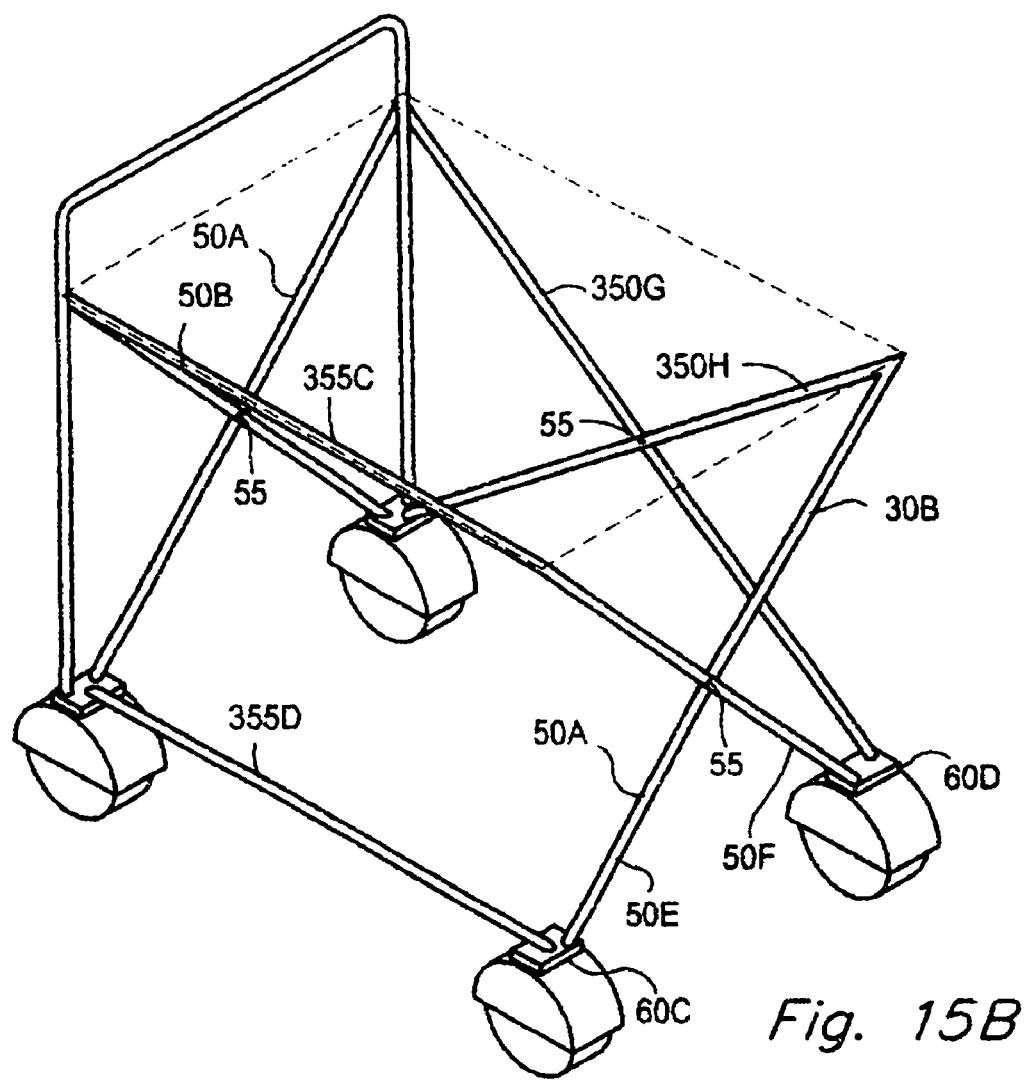
FIG. 15B is a schematic illustration of a cart having pivotally connected detachable telescoping horizontal support bar assemblies in an open and extended position.

FIG. 15A (FIG. 22A in CIP-2) is a schematic illustration of the collapsible frame in FIG. 14 with the telescoping crossed support arm assemblies 350G and 350H the detachable telescoping horizontal support bar assemblies 355C and 355D in an open non-extended position. FIG. 15B (FIG. 22B in CIP-2) shows the same frame with telescoping crossed support arm assemblies 350G and 350H and the detachable telescoping horizontal support bar assemblies 355C and 355D extended. Thus, by extending all of the telescoping crossed support arm assemblies 350G and 350H and keeping the bisecting point centered and by extending the detachable telescoping horizontal support bar assemblies 355C and 355D the length of the collapsible frame can be extended without changing the height or width. The width of a collapsible frame can also be adjusted by applying the same principle of telescoping crossed support arm assemblies to the front side or back side and detachable telescoping horizontal support bar assemblies to the opposite front or back side. Likewise, the length and the width can both be adjusted independently of each other on the same collapsible frame by using a combination of telescoping crossed support arm pairs and detachable telescoping horizontal support bar assemblies on all sides. Moreover, a frame's height can also be raised or lowered while keeping the same width and length through the use of telescoping crossed support arm pairs on all sides.

Figure 25:
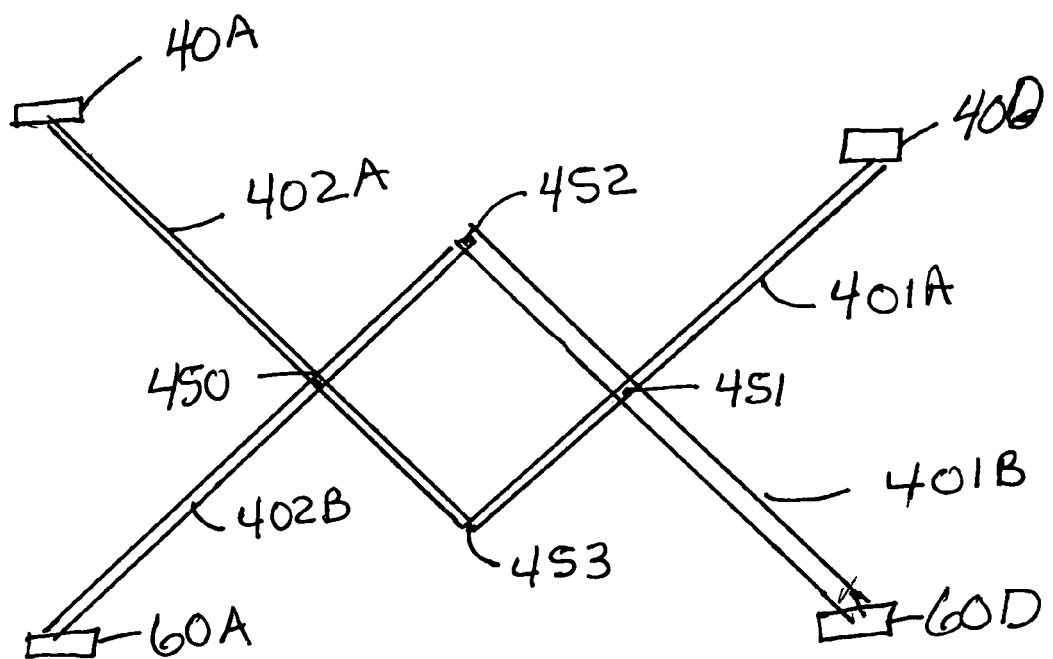
FIG. 25 illustrates four cross support members on one side of a crib frame.

In yet another embodiment of the invention, we disclose how to alter the set up width, height and or length of one or more sides through the use of Multiple Crossed members per side. FIG. 25 illustrates a Multiple Crossed member support side with four members that can be used as a substitute for telescoping crossed support arms 350G and 350H shown in FIG. 16. In FIG. 25, the upper end of member 401A is pivotally attached to upper corner bracket 40D and the lower end is pivotally attached to the lower end of 402A. The upper end of 402A is pivotally attached to upper corner bracket 40A. The lower end of 401A is pivotally attached to lower corner bracket 60D and the upper end is pivotally attached to the upper end of member 402B. The lower end of member 402B is pivotally attached to lower corner bracket 60A. Member 402A and 402B are pivotally attached at a point 450 equal distance from 40A and 60A respectively. Member 401A and 401B are pivotally attached at a point 451 equal distance for 40D and 60D respectively.

Figure 26:
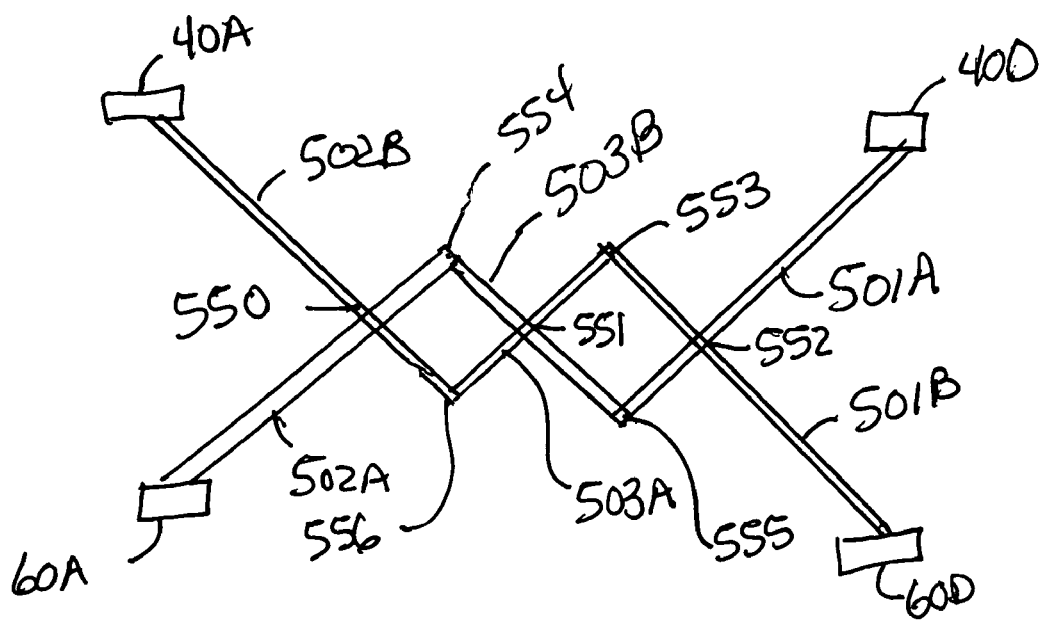
FIG. 26 illustrates multiple crossed support members on one side of a crib frame.

FIG. 26 illustrates a Multiple Crossed support side with six members that can be used as a substitute for telescoping crossed support arms 350G and 350H shown in FIG. 16. In FIG. 25, crossed members 501A and 501B intersect at pivotal point 552. Member 501A is pivotally attached to upper corner bracket 40D on the exterior corner of the Multiple Crossed member side and to an interior crossed support member 503B. Member 501B is pivotally attached to lower corner bracket 60D on the exterior corner of the Multiple Crossed member side and to an interior crossed support member 503A. Members 503A and 503B are pivotally attached to 501B and 501A at pivotal points 553 and 555 respectively. Crossed members 502A and 502B intersect at pivotal point 550. Member 502A is pivotally attached to upper corner bracket 40A on the exterior corner of the Multiple Crossed member side and to an interior crossed support member 503B. Member 502B is pivotally attached to lower corner bracket 60A on the exterior corner of the Multiple Crossed member side and to an interior crossed support member 503A. Members 503A and 503B are pivotally attached to 502B and 502A at pivotal points 556 and 554 respectively. Members 503A and 503B are pivotally connected at 551.

With respect to member lengths, the length for member segments 501B between pivot points 552 and 553, 503A between pivot point 553 and 551, 501A between pivot points 552 and 555 and 503B between pivot points 555 and 551 are always equal in length. The length for member segments 502B between pivot points 550 and 556, 503A between pivot point 556 and 551, 502A between pivot points 550 and 554 and 503B between pivot points 554 and 551 are always equal in length. Member segments 501A and 501B are equal in length. Member segments 502A and 502B are equal in length.

For purposes of clarity, we define exterior ends as those ends of cross support arms that connect to corner brackets. Thus in FIG. 25 members 401A, 401B, 402A and 402B have exterior ends that connect to corner brackets 40D, 60D, 40A and 60A respectively and in FIG. 26, members 501A, 501B, 502A and 502B have exterior ends that connect to 40D, 60D, 40A and 60A respectively. We define exterior end member segment as the member segment between the connection point at the corner bracket and the first point of intersection with another member. Thus in FIG. 26 the exterior end member segment for 502B is the member segment between 40A and the intersection point 550.

Referring now to cribs, beds, playpens, pens or play yards or a combination of these devices for use by babies, young children or pets. When the words crib, bed, playpen, pen or play yard are used in this specification it should be understood that they are being used interchangeably within this specification.

The collapsible frame structures and related embodiments that have previously been described for collapsible frames are applicable to those of cribs, beds, playpens, play yards and pens. When referring to the following drawings we continue to use like reference characters. The collapsible open-topped frame 100, shown in FIG. 16 (FIG. 25 in CIP-2), which can fulfill the function of a collapsible frame for a crib for a baby or young child or as a frame for a playpen or play yard when the baby or young child is not sleeping, was the basis for CIP-2.

The open topped collapsible frame in FIG. 16 is comprised of four telescoping sides with each side having a pair of crossed support arms 350A and 350B, 350C and 350D, 350E and 350F and 350G and 350H. Each pair of crossed support arms 350A and 350B, 350C and 350D, 350E and 350F and 350G and 350H are pivotally connected at the their center of rotation 55 and all crossed support arms 350 are of equal length.

As illustrated in FIG. 10, each crossed support arms 350A and 350B, 350C and 350D, 350E and 350F and 350G and 350H are essentially identical in construction with each arm comprised of an intermediate tubular section 351 and a pair of outer tubular sections 352 that telescope opposite ends into and out of said intermediate section 351. FIG. 11 illustrates a means for locking the outer telescoping tubular sections 352 at points equal distance to the pivotal connection point. Each outer tubular section 352 has formed therein a plurality of longitudinally spaced holes 321. Said holes 321 are spaced identically for each of the out tubular sections on a side and for each of the tubular sections on the side opposite. Thus assuring that the pivotal connection point 55 for each pair of crossed support arms 350 remains centered within the side defined by a string stretched around the outmost ends of the four outer tubular sections 352 on each side and also centered with the side opposite. Each intermediate tubular section 351 has a hole 322 formed therein similar to hole 321. A hairpin or V-shaped leaf spring 323 is housed in the inner end of each tubular section 351 and compressed between the opposing inside faces of tubular element 351 proximate holes 322. One of the legs of each leaf spring 323 is provided with a radially projecting detent 324 terminating in a rounded end and slidably engaging hole 322 and a selected axially aligned hole 321 to releasably lock intermediate tubular section 351 and respective tubular elements 352 and thus releasably lock telescoping crossed support arms 350 at a desired adjusted length.

For purposes of explanation the crib's 100 sides shall be labeled as follows, the side containing telescoping crossed support arms 350A and 350B shall be designated as the back and the side containing telescoping crossed support arms 350E and 350F shall be designated as the front. The left side as seen from the back facing the front incorporates telescoping crossed support arms 350G and 350H and the right side incorporates telescoping crossed support arms 350C and 350D.

As illustrated in FIG. 16, the crib 100 is comprised of four upper corner brackets 40A, 40B, 40C and 40D and four lower corner brackets 60A, 60B, 60C, and 60D and have telescoping cross support arms 350A and 350B, 350C and 350D, 350E and 350F and 350G and 350H attached to them as follows. The lower ends of the front right and left crossed support arms 350E and 350F and the lower ends of the right side telescoping crossed support arm 350C and the left side crossed support arms 350G are connected to the lower right and left front corner brackets 60C and 60D; and the lower ends of the right and left rear crossed support arms 350B and 350A and the lower end of the rear right side telescoping crossed support arm 350D and the left side telescoping crossed support arm 350H are connected to lower right and left rear corner brackets 60B and 60A; and similarly, the upper ends of the left and right front telescoping crossed support arms 350F and 350E and the upper front ends of the right and left side telescoping crossed support arms 350D and 350H are connected to upper right and left front corner brackets 40C and 40D and upper ends of the left and right rear crossed support arms 350A and 350B and the upper back ends of the right and left side telescoping crossed support arms 350C and 350G are connected to the upper right and left rear corner brackets 40B and 40A.

All of the crossed telescoping support arms 350 are pivotally connected to the four upper corner brackets 40A, 40B, 40C and 40D and four lower corner brackets 60A, 60B, 60C, and 60D allowing the frame to expand or collapse simultaneously in is both the X and Y direction. This is illustrated in FIG. 17A, FIG. 17B and FIG. 17C (FIG. 26A, FIG. 26B and FIG. 26C in CIP-2) which through schematic drawings.

Figure 17A:
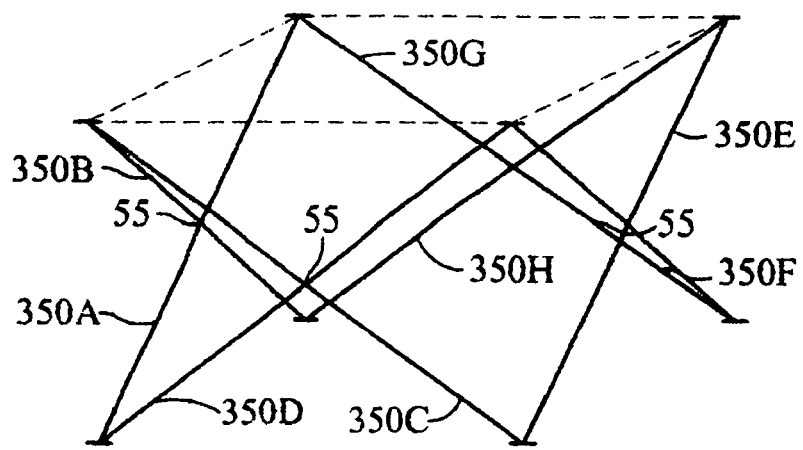
FIG. 17A illustrates an extendable collapsible crib frame in an open extended position.
Figure 17B:
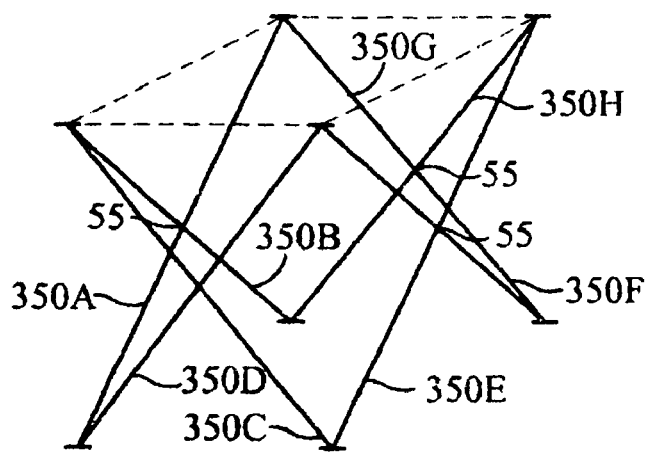
FIG. 17B illustrates an extendable collapsible crib frame in an open unextended position.
Figure 17C:
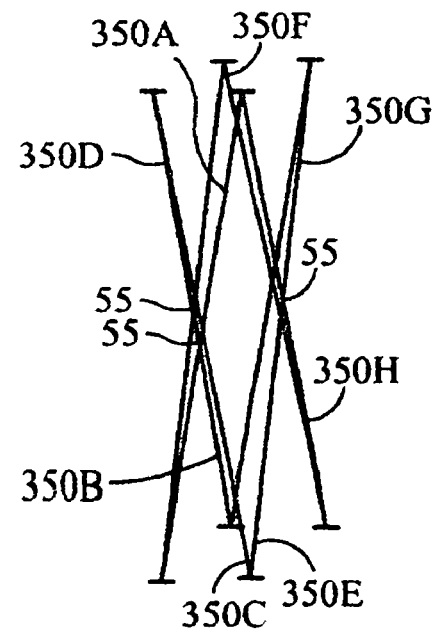
FIG. 17C illustrates an extendable collapsible crib frame in a partially closed position.

FIG. 17A—an open collapsible crib frame with telescoping crossed support arms extended, FIG. 17B—an open collapsible crib frame with telescoping arms unextended and a nearly collapsed crib frame and FIG. 17C—the collapsible frame in the near closed position. It can be seen that as the collapsible frame is closed all crossed support arms become essentially parallel to each other and upper and lower corner brackets will be separately aggregated together.

Figure 18:
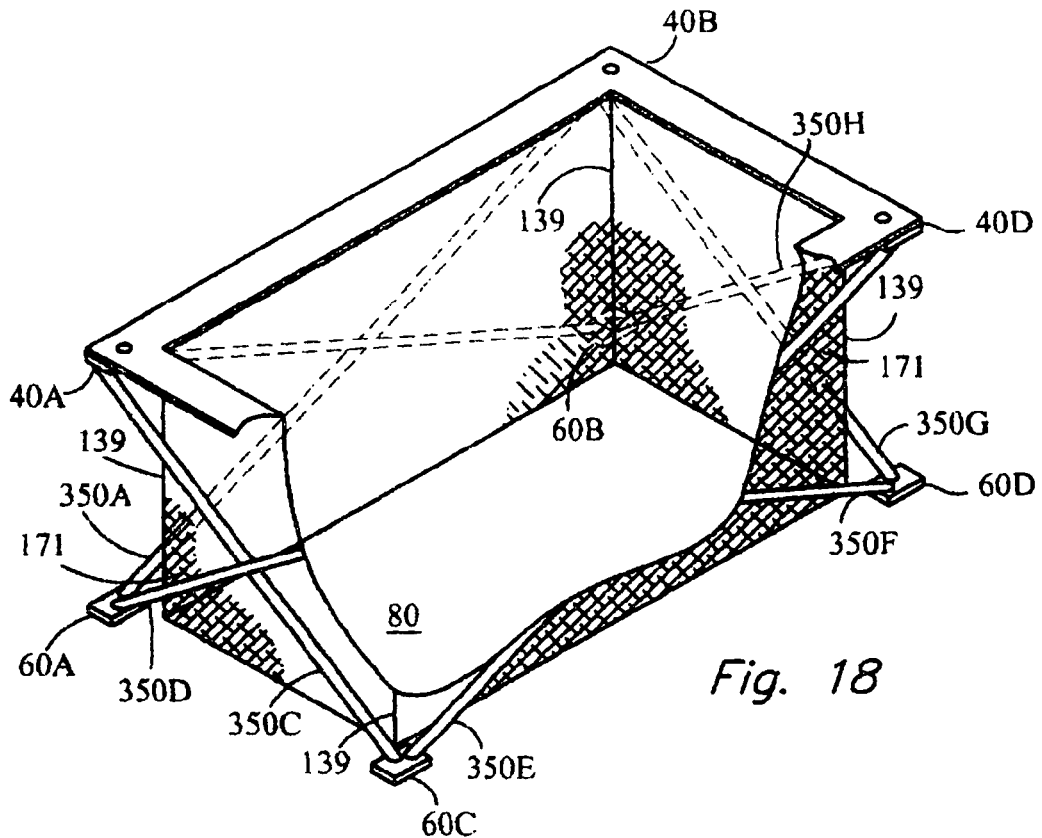
FIG. 18 illustrates a collapsible crib frame with flexible sidewalls and a flexible bottom.

FIG. 18 (FIG. 27 in CIP-2) is a cut away view of a crib frame that has flexible sidewalls 171 and a flexible bottom 80 attached. In the preferred embodiment of the CIP-2 invention, the sidewalls incorporate an SLE strap or web 200 into their construction. Said sidewalls 171 are generally placed inside the frame to form a protective barrier against a child falling and hitting the crossed support arm. The sidewalls 171 will generally be constructed of a flexible mesh fabric and the bottom will be made of a moisture barrier material to protect beds from possible urination accidents and children from dampness and moisture from the ground when used as a playpen. In a preferred embodiment, the perimeter formed by the sidewalls 171 is designed to be smaller than the perimeter defined by the four upper corner brackets or the lower corner bracket 60. In this example, the sidewalls are also designed to act as an Anti Collapse Locking Mechanism. The sidewalls 171 are attached to the lower corner brackets when the crib is open thus locking the structure in an open position by preventing the upward movement of the upper corner brackets 40 that is required to collapse the structure when the collapsible frame is sitting on a hard surface.

A removable mattress (not shown) may also be added to the bed or play pen. In addition a top netting or cover may also be added to the collapsible frame structure (not shown).

Figure 19:
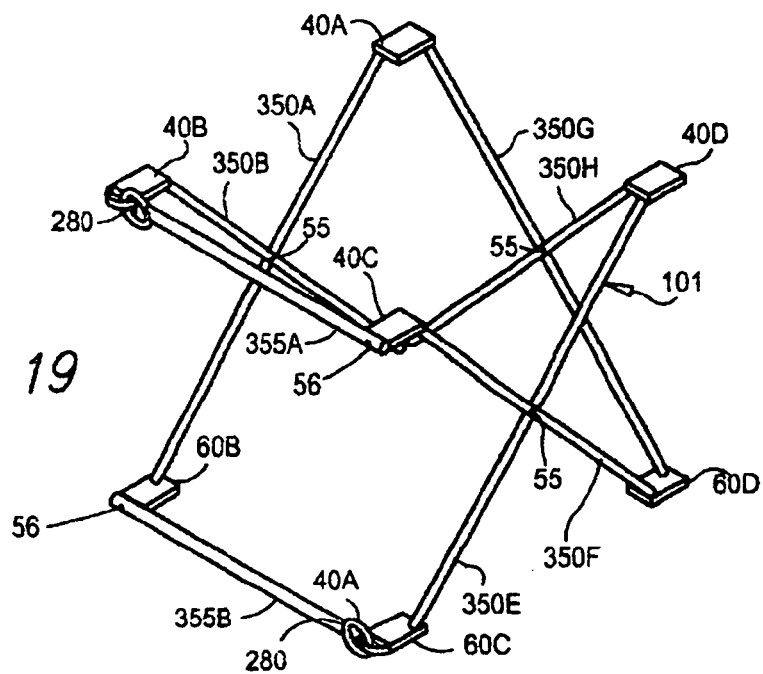
FIG. 19 illustrates a collapsible crib frame constructed with detachable telescoping horizontal support bar assemblies.

The subject of this application is yet another version of the collapsible crib frame as illustrated in FIG. 19 (FIG. 28 in the CIP-2), Because the patent office has determined the crib illustrated by FIG. 19 to be a different species than that of FIG. 18, we describe our invention in more detail. The back, front and left sides of the crib are constructed as previously described in FIG. 18. For purposes of explanation, the four-sided crib frame 101 illustrated in FIG. 19 has been labeled in a manner similar to that of the four-sided crib frame of FIG. 18. The side containing telescoping crossed support arms 350A and 350B is designated as the back, the side containing telescoping crossed support arms 350E and 350F is designated as the front and the side containing crossed support arms 350G and 350H is designated as the left side. The remaining side is comprised of two telescoping horizontal telescoping crossed support arms 355A and 355B and is designated as the right side.

Each pair of telescoping crossed support arms 350 is pivotally connected where the support arms bisect each other and are of equal length. As illustrated previously in FIG. 10, each telescoping crossed support arm is essentially identical and is comprised of an intermediate tubular section 351 and a pair of outer tubular sections 352 that telescope opposite ends into and out of said intermediate section 351 and is similar in functionality to those described in FIG. 11. FIG. 19 illustrates, two detachable telescoping horizontal support bar assemblies 355. One support bar 355B is pivotally connected to front lower corner bracket 60B and has a snap fitting 280 mounted on the other end in order to quickly connect and disconnect from the front lower corner bracket 60C. The other detachable telescoping horizontal support bar 355A is pivotally connected to the front upper corner bracket 40C and has a snap fitting 280 mounted on the other end in order to quickly connect and disconnect from the upper corner bracket 40B. The detachable telescoping horizontal support bar assemblies 355A and 355B telescope in a manner similar to that previously illustrated in FIG. 14. Each bar has an inner tubular section 351 that slides within an outer tubular section 352. The outer tube 352 has formed therein a plurality of longitudinally spaced holes 321. Said holes 321 are spaced to create a predetermined bar length when the previously described V-shaped or hairpin spring 323 is engaged into a specific hole. The predetermined bar lengths are established to keep the frame in a rectangular shape, thus keeping an equal distance between upper corner brackets 40A and 40D and 40B and 40C and lower corner brackets 60A and 60D and 60B and 60C.

As illustrated in FIG. 19, the crib frame 101 is comprised of four upper corner brackets 40A, 40B, 40C and 40D and four lower corner brackets 60A, 60B, 60C and 60D. All telescoping crossed support arms 350 for the back and left and right sides are connected to the upper and lower corner brackets as described in FIG. 16. The pivotal end of the upper detachable telescoping horizontal support bar 355A is attached to the upper corner bracket 40C and the pivotal end of the lower detachable telescoping horizontal support bar 355B is attached to the lower corner brackets 60B.

Thus, the three pair of telescoping crossed support arms, the detachable horizontal-telescoping support bar assemblies and the corner brackets form a size adjustable, collapsible open topped frame when the upper corner brackets 40 and the lower corner brackets 60 are spread apart and the horizontal telescoping bar assemblies 355 are connected. The collapsible frame can be made into a crib and locked into position with the addition of an SLE. We have previously described in FIG. 18 an SLE 200 incorporated into the sidewalls 171, and a bottom 80 that could also be used with the collapsible frame illustrated in FIG. 19. As previously described for FIG. 16, the crib frame is locked into its open position by SLE 200 which has been incorporated into the sidewalls 171 and the side walls also acts as an Anti Collapse Locking Mechanism.

When it is desired to collapse the frame illustrated in FIG. 19 for storage or transit, the two detachable horizontal support bar assemblies, 355A and 355B are detached from corner brackets 60C and 40D. Once detached, these brackets can be telescoped inwards upon themselves and rotated so to a vertical alignment. Thus when all of the upper corner brackets are together, and all of the lower corner brackets are together, and all of the crossed support arms are lined up in essentially parallel alignment, the two detachable horizontal bar assemblies, 355A and 355B will also lay essentially in parallel alignment.

Figure 20:
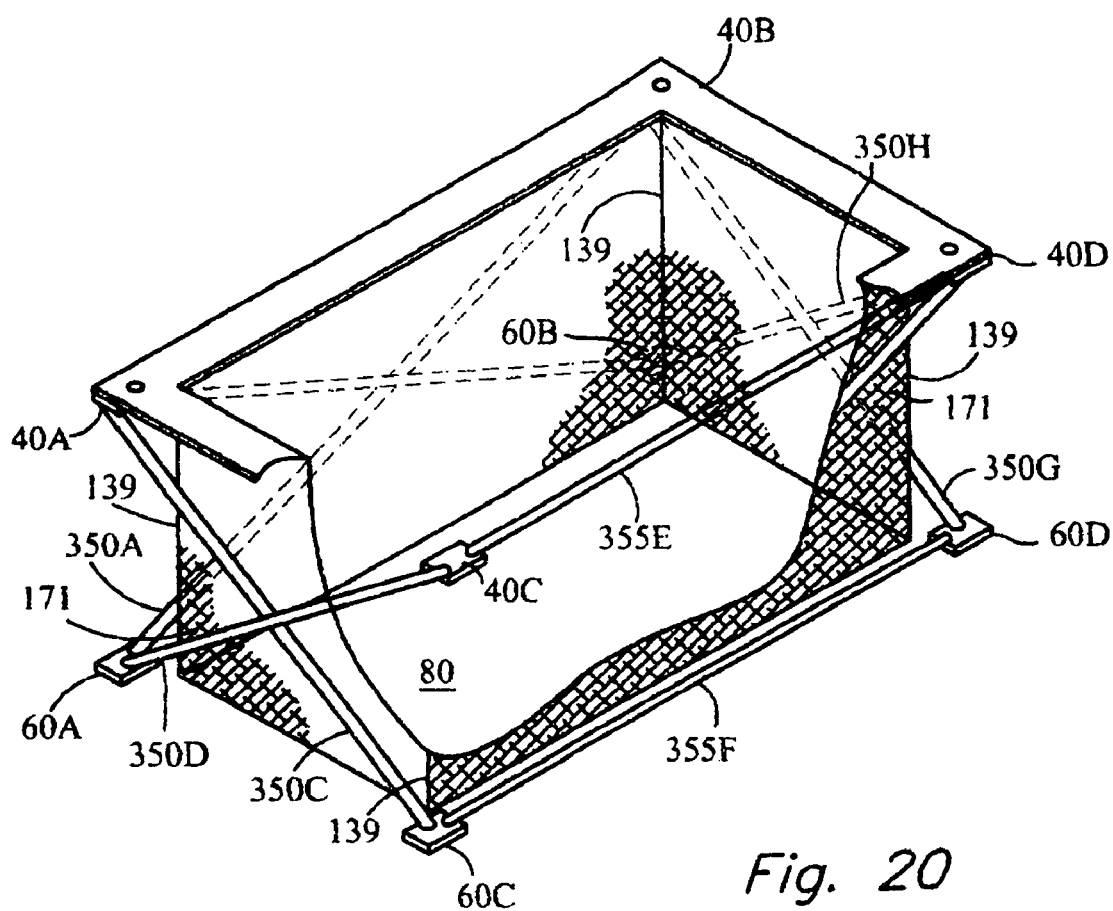
FIG. 20 illustrates a collapsible crib frame constructed with detachable telescoping horizontal support bar assemblies and flexible sidewalls and a flexible bottom.

FIG. 20 is similar to FIG. 18 in that it illustrates a crib with a flexible liner 171 and floor 80. The collapsible frame, which contains four upper corner brackets 40A, 40B, 40C and 40D, four lower corner brackets 60A, 60B, 60C, and 60D, three telescoping cross arm supports 350A and 350B, 350C and 350D, and 350G and 350H and two detachable horizontal support arm assemblies 355E and 355F, can be made into a crib and locked into position with the SLE 171. We have previously described in FIG. 18 an SLE 200 incorporated into the sidewalls 171, and a bottom 80 that could also be used with the collapsible frame illustrated in FIG. 20. In FIG. 20 we have also incorporated a flexible Anti-Collapse Locking Mechanism 139 into the liner. This concept has been previously discussed in connection with FIG. 8.

The crib designs illustrated in this specification are but a few of the designs that are possible based on using combinations of the embodiments of pivotally connected cross support arms 50, pivotally connected telescoping cross support arms 350, telescoping anti-torque posts 35, detachable horizontal support bar assemblies (not shown), detachable horizontal telescoping support bar assemblies 355, SLE's and Anti-locking Mechanism disclosed in this specification. It is not our intent to limit possible crib designs to those designs disclosed in this specification, but rather to consider them as examples of the many possible designs which can be created using the disclosed design elements.

Figure 21:
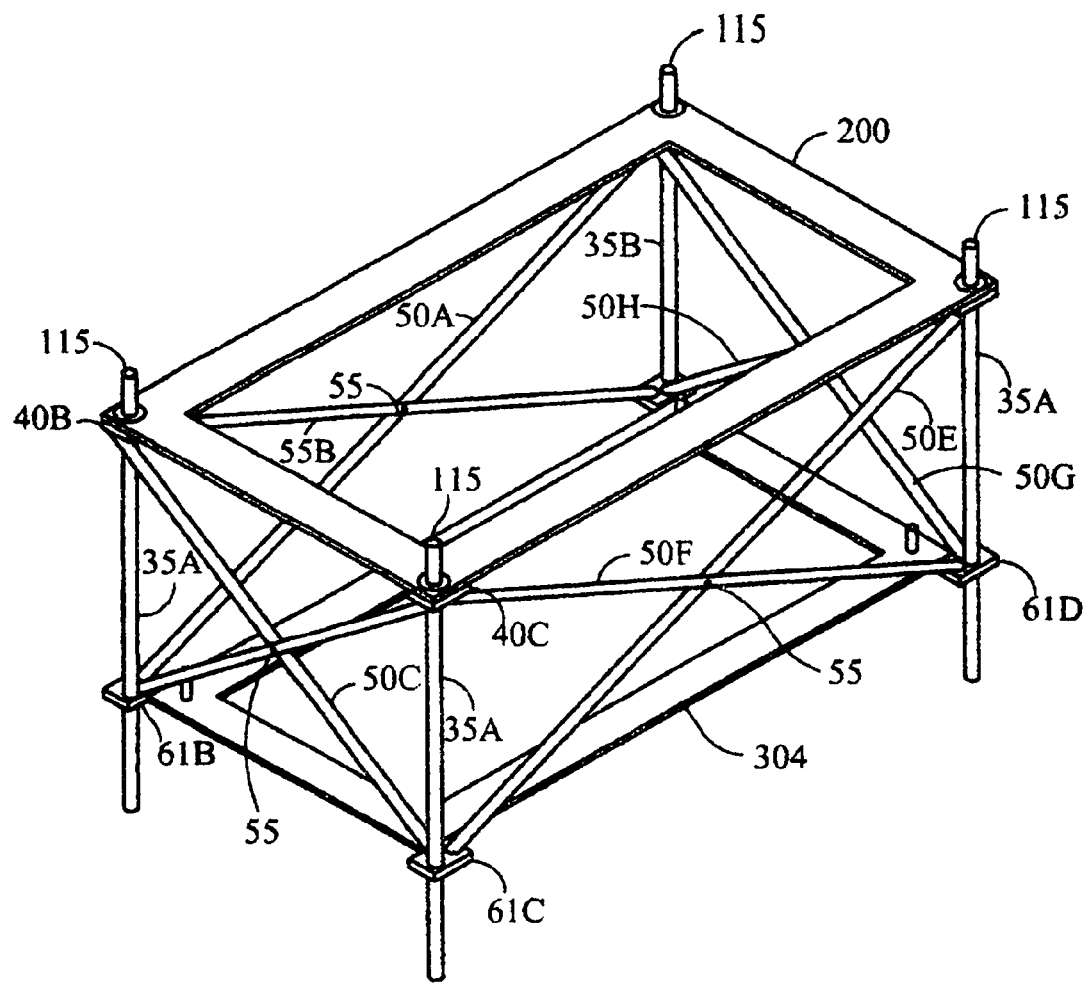
FIG. 21 illustrates a collapsible structure sitting on leg extensions from the lower corner brackets and a rigid SLE attached to the lower corner brackets.

Although we have not discussed it during our presentation of crib frames, it is possible to attach or extend telescoping legs from the lower corner brackets 61 such that the crib sleeping area will be raised above the ground. As illustrated in FIG. 21, a rigid SLE 304 is attached to lower corner brackets 61A, 61B, 61C, and 61D to provide a surface upon which a mattress could be placed for sleeping. Telescoping anti-torque posts 35 are extended below the lower corner brackets 61 and are held in place by a locking mechanism.

A preferred embodiment is to place the collapsible crib upon a juvenile or adult bed and thus take advantage of an existing sleeping space and mattress. To achieve this end we introduce an embodiment that makes this possible—Anti-Tip Assemblies. Small babies and children who do not crawl or walk are often left on beds in bassinets or similar type portable beds to rest as there is little risk or fear of the child tipping the portable bed by rolling over. However, as the child grows and gains the ability to stand and apply weight to the upper edges of a portable bed, the potential exists for the child to topple the portable bed and fall onto the floor increases dramatically. Thus, children with the ability to stand and walk are not placed in portable beds resting on juvenile or adult beds.

Figure 22:
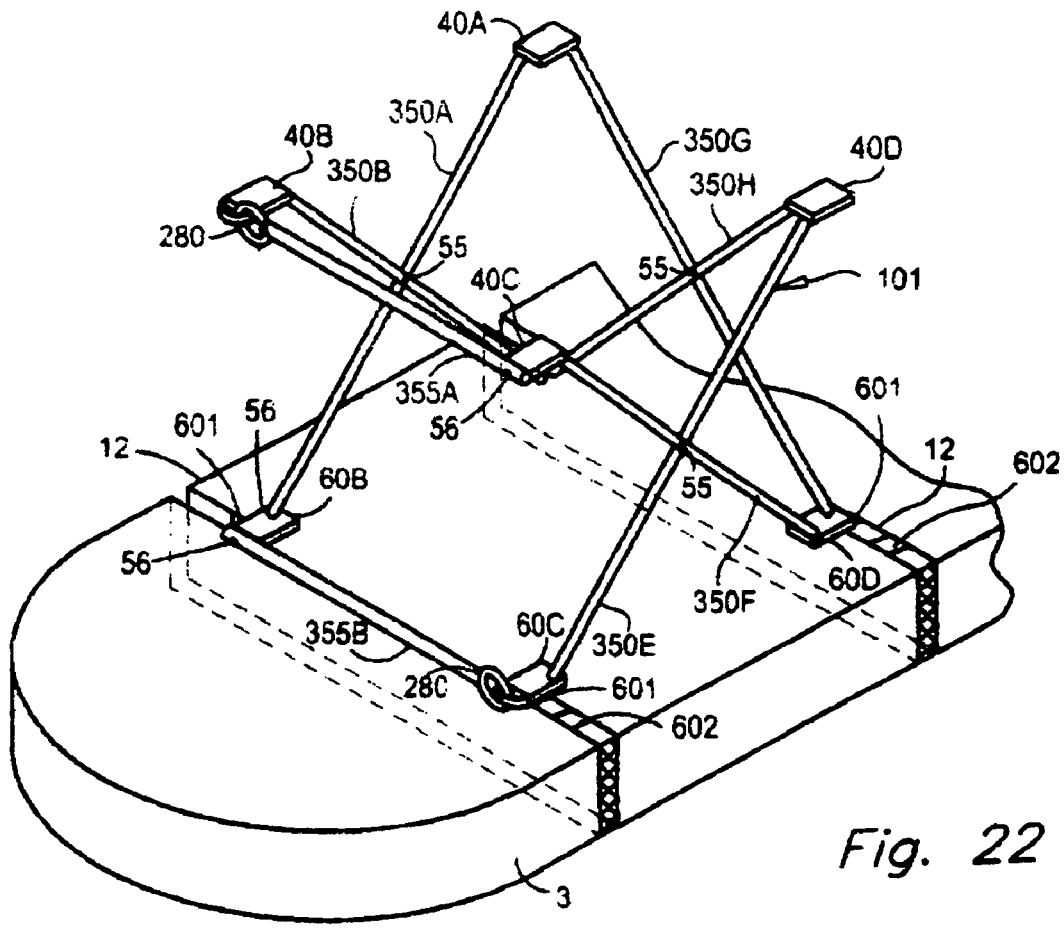
FIG. 22 illustrates a Tie Down Assembly to prevent tipping of a collapsible structure.

FIG. 22 illustrates an Anti-Tip Assembly (tie down straps) that can be incorporated into the lower or upper corner brackets of collapsible beds that eliminates the potential for children who can stand and walk from tipping a collapsible crib. In FIG. 22, a collapsible crib frame 100 is placed upon a mattress 3. An Anti-Tip Assembly 12 consists of detachable straps 600 that attach to each other or to the bed mattress 3 or frame and to the lower corner brackets 60. FIG. 22 illustrates one end of detachable straps 600A, 600B, 600C, and 600D attached with clips 601 onto each lower corner brackets 60A, 60B, 60C and 60D respectively. The straps 600A and 600B are placed underneath the mattress 3 and are connected to a buckle 602 on 600D and 600C respectively. The straps 600 are then tightened to lock the collapsible crib frame to the mattress 3 thus preventing it from tipping or skidding should a child's weight be applied to in a manner that might otherwise cause the crib to tip or skid.

Once the concept of an Anti-Tip Assembly for securing the collapsible frame to a juvenile or adult bed is recognized, one skilled in the art can derive many means of accomplishing the task of anchoring a collapsible crib frame to a bed. For example, to avoid having to go under the mattress 3 one might use a U shaped hook attached to a strap to hook onto the side of a mattress and then secure the strap to a corner bracket with a cinch buckle.

Figure 23:
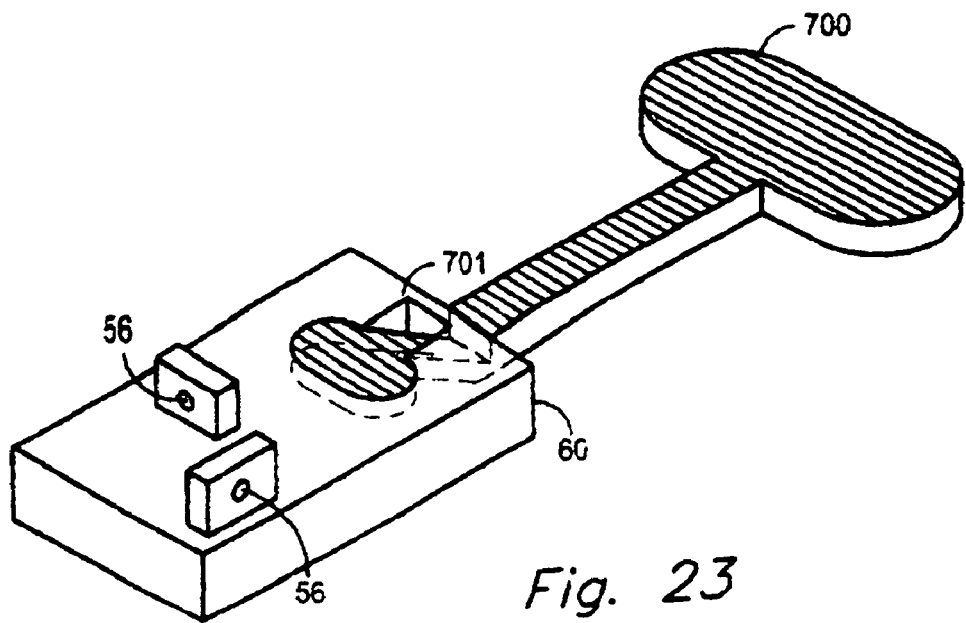
FIG. 23 illustrates an Anti-Tipping Assembly incorporated into a corner bracket design.

Alternatively, if the collapsible crib is to be used as a playpen on the ground, there will be no mattress to anchor the frame to in order to avoid tipping. FIG. 23 illustrates an Anti-Tipping Assembly that can be used with and without ground anchors. The Anti-Tipping Assembly consists of a lower corner bracket 60 that has pivotal connection points 56 for support arms such as crossed support arms, telescoping crossed support arms or telescoping horizontal support bar assemblies. The corner bracket 60 also has a cut out area 701 into which an anti-tip extension bar 700 fits. The cut out area on the lower corner bracket 60 is design such that the anti-tip extension bar 700 provides a resistance force to any pressure applied to the frame in the direction of the anti-tip extension bar 700 and thus keeps the collapsible structure from tipping over. The lower corner bracket 60 is also designed to allow the anti-tip extension bar 700 to be removed from the corner bracket by moving the extended end of the anti-tip extension bar 700 downward to a perpendicular angle to the bottom of the corner bracket 60, rotating the bar 90 degrees and dropping it out the bottom of the corner bracket 60. Thus the crib can be collapsed to a very small size when the anti-tip extension bar 700 is removed when the frame is collapsed, yet provide stability when the frame is open and the anti-tip bar is installed.

Figure 24:
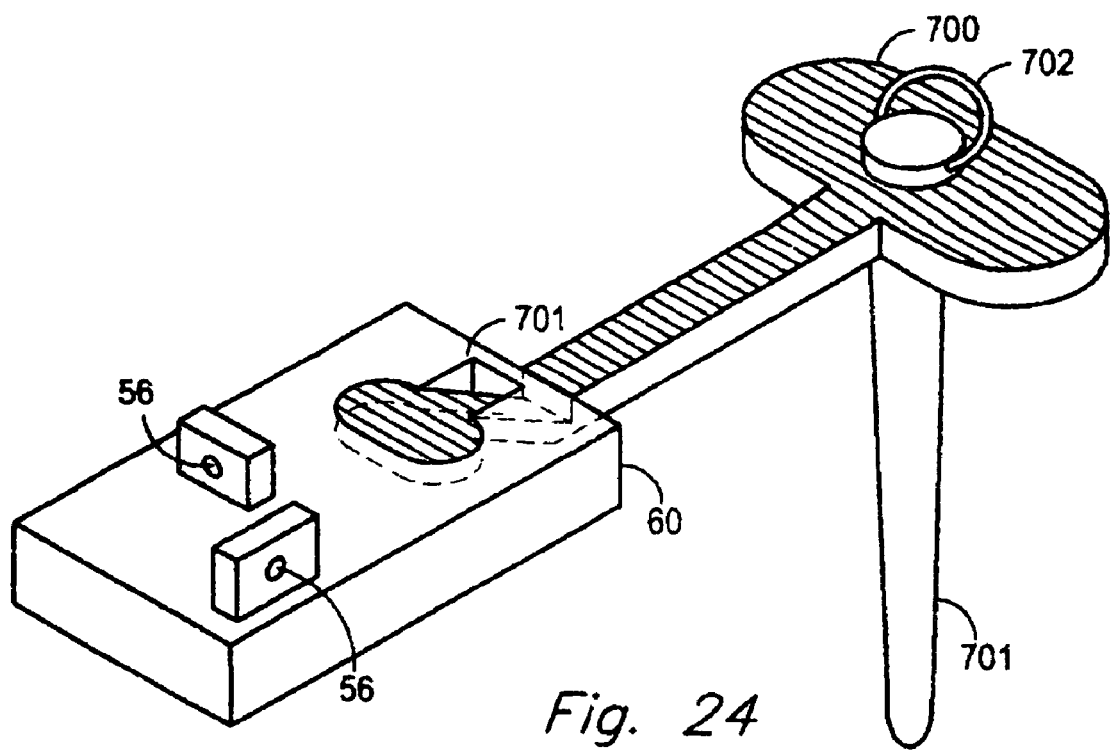
FIG. 24 illustrates an Anti-Tipping Assembly incorporated into a corner bracket with provision for a ground spike.

When the anti-tip extension bar 700 is to be used for other collapsible structures such as protective sheds for building products, an additional ground spike modification is added to keep the collapsible structure from being lifted by the wind. FIG. 24 illustrates the addition of a spike 701 that is inserted into the ground through a hole in the anti-tip extension bar 700. For easy of removing the spike 701 from the ground when it is desire to collapse the structure, a ring 702 has been added to the head of the spike 700.

Throughout this specification we have described telescoping crossed support arms 350 as being comprised of intermediate sections 351 and outer sections 352. This was done for convenience in describing the embodiments. It should be understood that any telescoping element can consist of a number of intermediate sections and outer sections and that what is an outer section to a centered intermediate section may also be an intermediate section to a further outer section. Thus, any description of telescoping arm elements should be considered to assume that the arm can have at least three or more sections.

Throughout this specification we have depicted the corner bracket in illustrations as a solid piece to which the crossed support arms are pivotally attached such as illustrated with corner bracket 61B in FIG. 18. The corner brackets may, however, also be made of flexible materials such as a shock cording material which will permit the support members to pivot from an open to closed position and vice versa.

In the specification we talk about bisecting crossed support arms and bisecting telescoping crossed support arms. It is our intent that the length being divided in half is the distance between the upper and lower corner brackets on each arm. Moreover, it is also our intent that when support arms are considered to be the same length, that the length is measured between the upper and lower corner brackets.

In the specification we refer to intermediate telescoping sections 351 and outer telescoping sections 352 in relation to the center point of the arm with respect to the other sections and not to whether a section slides inside or outside of another tubular section. Although the examples have been illustrated with the intermediate section being the smaller diameter tube over which the outer tube sides the converse is also possible.

Inner and outer tubular sections of telescoping bar assemblies 355 are also reversible and the telescoping bars may consist of more than two telescoping sections.

Most of the discussion in the specification has been related to four sided collapsible frames with closing occurring in the X and Y directions. This has been for easy of understanding the basic concept of the invention. It is our intent that collapsible structures can be made of three or more sides and that each corner bracket which has attached members shall have pivoting support arms which open and close to form an enclosed area within the open frame. Moreover, such support arms weather they be horizontal or crossed can may be constructed as telescoping or fixed in length.

The invention claimed is:

1. A portable collapsible crib frame collapsible simultaneously in at least two directions for a small child or animal comprising:
    a. a collapsible crib frame having at least three sides comprising:
        i. at least one side comprised of at least two crossed support arms pivotally attached to upper and lower corner brackets,
        ii. at least one side comprised of at least four crossed support arms with exterior members pivotally attached to upper and lower corner brackets,
        iii. each of said crossed support arms pivotally connected,
        iv. said corner brackets also attached to adjacent side exterior member crossed support arms when present,
        v. at least one crib side,
            1. that does not contain at least two crossed support arms, 2. comprised of at least one detachable horizontal support arm,
3. said horizontal support arm(s) connected between at least one of: two adjacent upper corner brackets, two adjacent lower corner brackets,
   a. said upper corner brackets connected to the corresponding upper ends of the crossed support arms on the adjacent sides,
   b. said lower corner brackets connected to the corresponding lower ends of crossed support arms on the adjacent sides,
vi. all sides connected so as to form the perimeter around an interior formed cavity when the crib is in its open position,
b. said crib further comprising a Structure Locking Element connecting at least one of: all upper corner brackets, all lower corner brackets; said Structure Locking Element circumscribing in a continuous manner at least one of: the corner brackets, a perimeter established inside the corner brackets.

2. The collapsible crib frame as recited in claim 1, wherein at least one corner bracket contains an anti-tipping mechanism.

3. The collapsible crib frame as recited in claim 1, furthermore including at least one of: a bottom, a liner, a top.

4. The collapsible crib frame as recited in claim 1, wherein the crib is furthermore comprised of vertically aligned Anti-Collapse Mechanisms.

5. The collapsible crib frame as recited in claim 1, wherein a liner, the Structure Locking Element and Anti-Collapse Mechanisms are incorporated into a single assembly.

6. The collapsible crib frame as recited in claim 1, further including at least two telescoping anti-torque posts each extending between a lower corner bracket and its vertically aligned upper corner bracket.

7. The collapsible crib frame as recited in claim 1, is provided with wheels.

8. The collapsible crib as recited in claim 1 further including means for opening and closing a liner sidewall in the vertical plane on the side wall comprised of at least one horizontal support arm.

9. The collapsible crib as recited in claim 8, wherein at least one upper horizontal support arm can be separated at a point in vertical alignment with the vertical opening in the liner wall to allow access to the crib's interior through the sidewall.

10. The collapsible crib frame as recited in claim 1, wherein at least one of: a pair of crossed support arms, a horizontal cross arm is telescoping.

11. A collapsible crib frame for a small child or animal comprising:
    a. a frame collapsible simultaneously in two directions which comprises:
       i. at least two sides each comprised of at least two crossed support arms with exterior members pivotally attached to upper and lower corner brackets,
       ii. each of said crossed support arms pivotally connected,
       iii. at least one side comprised of at least four crossed support arms with exterior members pivotally attached to upper and lower corner brackets,
       iv. each exterior cross support arm member about the same length as all other pairs of crossed support arms when the crib is in its collapsed state,
       v. said corner brackets also attached to adjacent side crossed support exterior arm members when present,
       vi. all sides connected so as to form the perimeter around an interior formed cavity,
    b. said crib further comprising a Structure Locking Element connecting at least one of: all upper corner brackets, all lower corner brackets, said Structure Locking Element establishing a perimeter around an interior formed cavity,
    c. means to prevent the crib from collapsing comprising at least one Anti-Collapse Mechanism attached between a lower corner bracket and its vertically aligned and associated upper corner bracket.

12. The collapsible crib frame as recited in claim 11, furthermore including at least one of: a bottom, a liner, a top.

13. The collapsible crib as recited in claim 11, wherein at least one corner bracket contains an Anti-Tipping Mechanism.

14. The collapsible crib frame as recited in claims 11, wherein at least one pair of crossed support arms is telescoping.

15. The collapsible crib frame as recited in claim 11, is provided with wheels.

16. The collapsible crib frame as recited in claim 11, wherein a liner, the Structure Locking Element and the Anti-Collapse Mechanisms are incorporated into a single assembly.

17. The collapsible crib frame as recited in claim 11, further including at least two telescoping anti-torque posts each extending between a lower corner bracket and its vertically aligned upper corner bracket.

* * * * *